(12) United States Patent
Gonzalez Mendivil et al.

(10) Patent No.: US 11,541,935 B2
(45) Date of Patent: Jan. 3, 2023

(54) VEHICLE FRAME

(71) Applicant: METALSA S.A. DE C.V., Apodaca (MX)

(72) Inventors: Andres Horacio Gonzalez Mendivil, Toluca (MX); Mario Ricardo Gonzalez Quezada, Apodaca (MX); Luis Miguel Contreras Monrreal, Nuevo Leon (MX)

(73) Assignee: METALSA S.A. DE C.V., Nuevo Leon (MX)

( * ) Notice: Subject to any disclaimer, the term of this patent is extended or adjusted under 35 U.S.C. 154(b) by 101 days.

(21) Appl. No.: 17/217,150

(22) Filed: Mar. 30, 2021

(65) Prior Publication Data
US 2021/0300476 A1 Sep. 30, 2021

Related U.S. Application Data

(60) Provisional application No. 63/002,084, filed on Mar. 30, 2020.

(51) Int. Cl.
*B60J 7/00* (2006.01)
*B62D 21/15* (2006.01)
*B60K 1/04* (2019.01)

(52) U.S. Cl.
CPC .... *B62D 21/157* (2013.01); *B60K 2001/0438* (2013.01)

(58) Field of Classification Search
CPC ... H04L 5/001; H04L 5/0053; A61K 2300/00; A61K 9/4858; A61P 29/00;
(Continued)

(56) References Cited

U.S. PATENT DOCUMENTS 4,365,681 A * 12/1982 Singh .................. H01M 50/20
180/68.5
5,681,057 A * 10/1997 Whirley ................ B60L 50/66
180/68.5
(Continued)

OTHER PUBLICATIONS

Docol, "Docol 1200CP," <https://www.ssab.com/products/brands/docol/products/docol-1200cp> web page available at least as early as Jun. 7, 2019.
(Continued)

*Primary Examiner* — Kiran B Patel
(74) *Attorney, Agent, or Firm* — Gregory D. DeGrazia; Miller, Canfield, Paddock & Stone PLC

(57) ABSTRACT

A vehicle frame for a hybrid or electric vehicle includes a pair of longitudinally-extending side rails being positioned in spaced relation across a width direction of the vehicle frame to define a battery space therebetween. A side impact absorber is positioned on a first one of the pair of longitudinally-extending side rails. A first member of the side impact absorber is secured to an outboard sidewall of the first side rail to define a first impact energy-absorbing load path to the first side rail. The first member has a wave-form shape and extends laterally outward from the outboard sidewall to an outboard end of the side impact absorber. A second member of the side impact absorber is secured to the outboard sidewall of the first side rail, further from a height-wise center thereof, the second member defining a second impact energy-absorbing load path from the outboard end of the side impact absorber to the first side rail.

20 Claims, 15 Drawing Sheets

(58) Field of Classification Search
CPC ........... B60R 2021/0006; B60R 21/207; Y02E 60/50; F01L 1/02; F01L 1/022
See application file for complete search history.

(56) References Cited

U.S. PATENT DOCUMENTS

| | | | |
|---|---|---|---|
| 9,061,712 B2* | 6/2015 | Patberg | B62D 21/157 |
| 9,227,582 B2* | 1/2016 | Katayama | B62D 21/07 |
| 10,967,722 B2* | 4/2021 | Tanaka | B60L 50/66 |
| 10,988,186 B2* | 4/2021 | Makowski | B62D 27/065 |
| 2017/0225558 A1* | 8/2017 | Newman | B60L 50/64 |
| 2017/0225587 A1* | 8/2017 | Newman | H05K 999/99 |

OTHER PUBLICATIONS

Docol, "Docol 800CP," <https://www.ssab.com/products/brands/docol/products/docol-800cp> web page available at least as early as Feb. 17, 2019.

Docol, "Docol 1500M," <https://www.ssab.com/products/brands/docol/products/docol-1500m> web page available at least as early as Feb. 17, 2019.

* cited by examiner

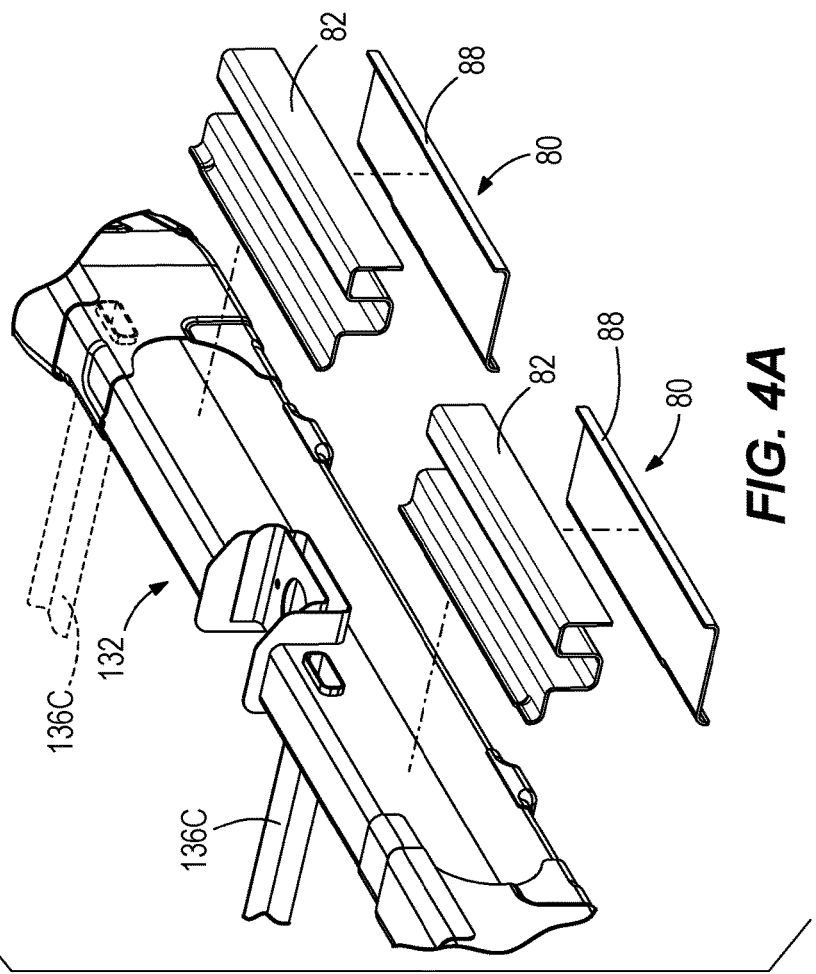
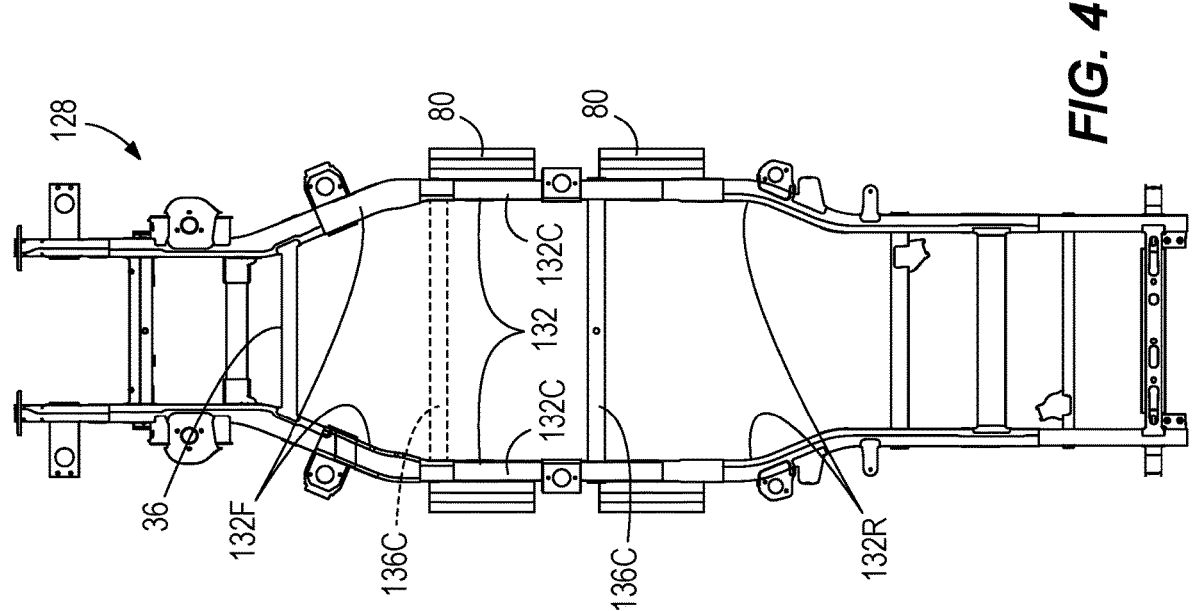

VEHICLE FRAME

CROSS-REFERENCE TO RELATED APPLICATIONS

This application claims priority to U.S. Provisional Patent Application No. 63/002,084 filed on Mar. 30, 2020, the entire contents of which are incorporated by reference herein.

BACKGROUND

The present invention relates to vehicular frames and particularly truck frames, and further relates to side impact protection.

SUMMARY

In one aspect, the invention provides a vehicle frame for a hybrid or electric vehicle, the frame including a pair of longitudinally-extending side rails being positioned in spaced relation across a width direction of the vehicle frame to define a battery space therebetween, and a side impact absorber positioned on a first one of the pair of longitudinally-extending side rails. The first side rail includes a vertically-extending outboard sidewall, and a bottom wall extending inward from a bottom of the outboard sidewall to an inboard sidewall of the first side rail, wherein a first member of the side impact absorber is secured to the outboard sidewall of the first side rail to define a first energy-absorbing load path to the first side rail in the event of a side impact, the first member having a wave-form shape and extending laterally outward from the outboard sidewall to an outboard end of the side impact absorber, and wherein a second member of the side impact absorber is secured to the outboard sidewall of the first side rail, nearer the bottom wall than the first member of the side impact absorber, the second member defining a second energy-absorbing load path from the outboard end of the side impact absorber to the first side rail in the event of a side impact.

In another aspect, the invention provides a vehicle frame for a hybrid or electric vehicle. The frame includes a pair of longitudinally-extending side rails being positioned in spaced relation across a width direction of the vehicle frame to define a battery space therebetween. A side impact absorber is positioned on a first one of the pair of longitudinally-extending side rails, the side impact absorber comprising first and second members. The first member of the side impact absorber is secured to the first side rail to define a first energy-absorbing load path through the side impact absorber to the first side rail in the event of a side impact. The second member of the side impact absorber is secured to the first side rail, the second member defining a second energy-absorbing load path through the side impact absorber to the first side rail in the event of a side impact. The second energy-absorbing load path is stiffer than the first energy-absorbing load path of the first member and positioned further from a height-wise center of the first side rail than the first energy-absorbing load path of the first member.

Other aspects of the invention will become apparent by consideration of the detailed description and accompanying drawings.

BRIEF DESCRIPTION OF THE DRAWINGS

FIG. 4 is a plan view of a vehicle frame according to one embodiment of the present disclosure, including a multi-member side impact absorber thereof.

FIG. 4A is exploded perspective view of the multi-member side impact absorber portion of the frame of FIG. 4.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
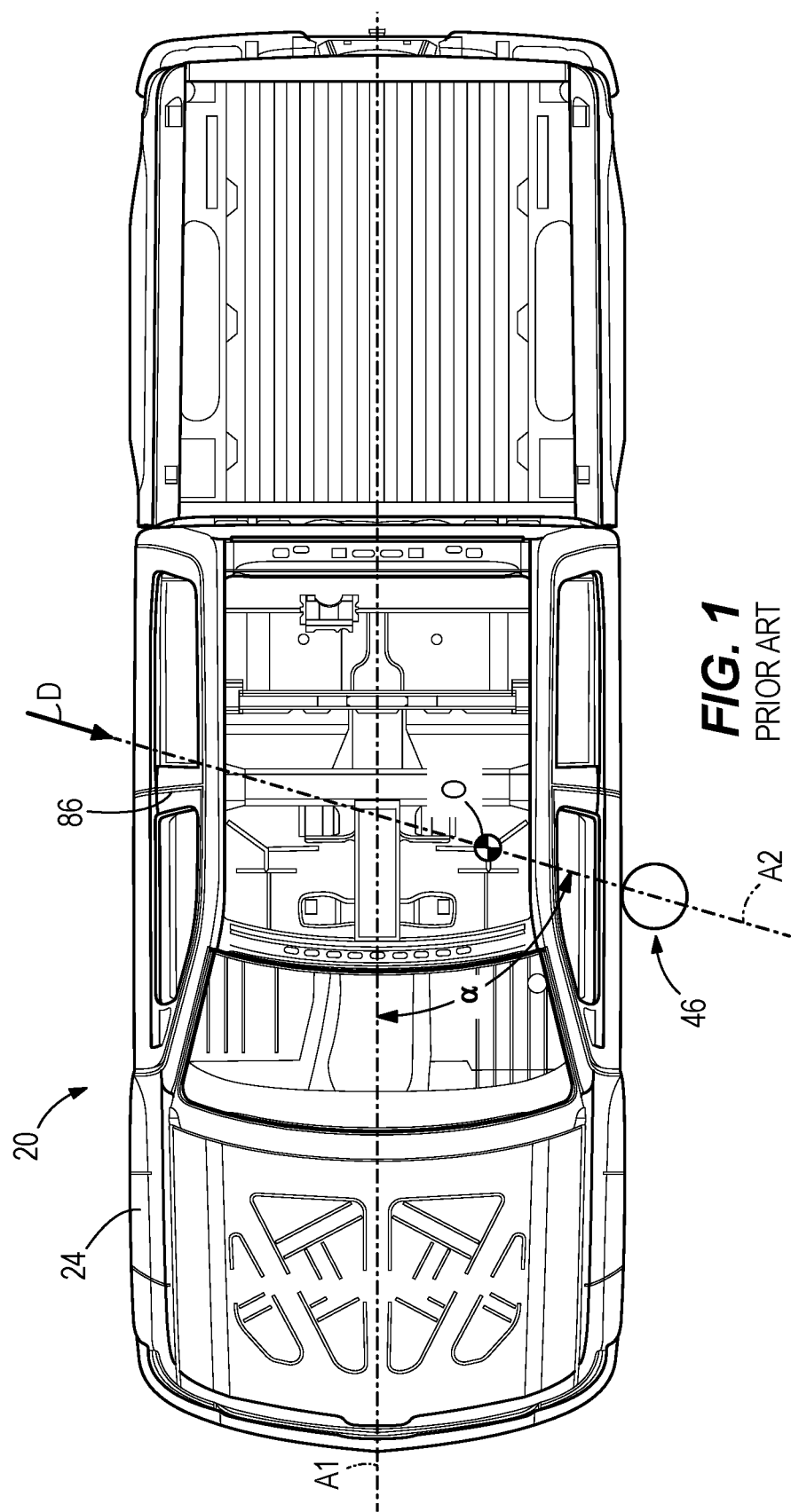
FIG. 1 is a plan view of an electric or hybrid drive vehicle having a conventional frame, subject to rigid pole side impact testing.
Figure 2:
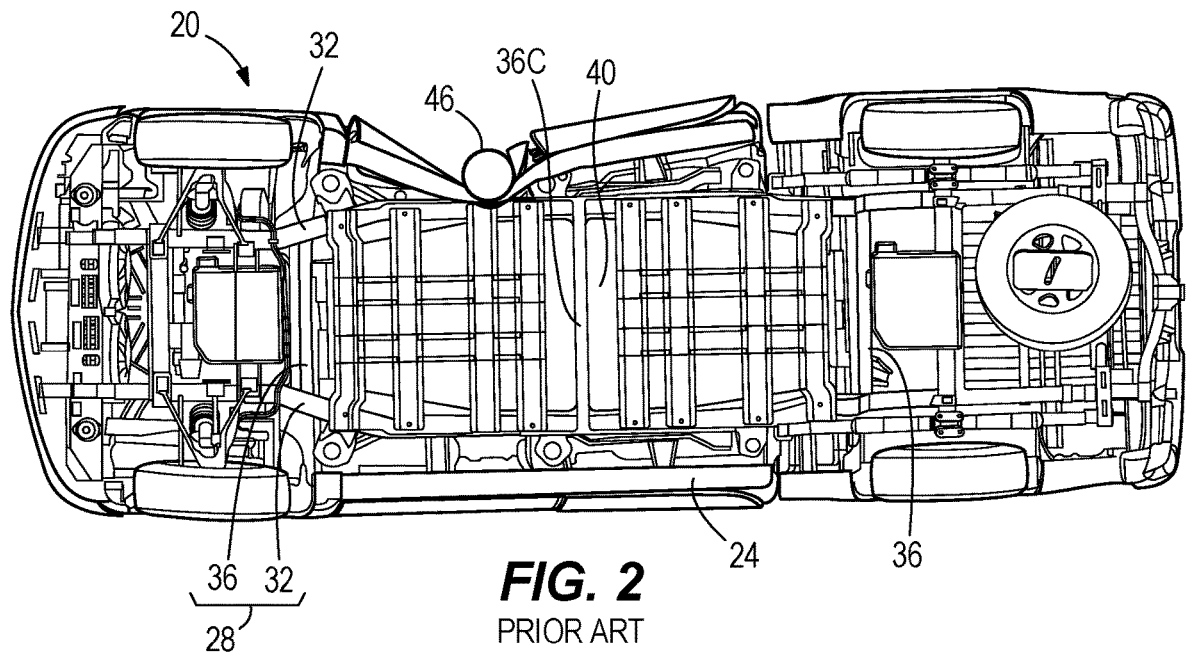
FIG. 2 is a bottom view of the vehicle of FIG. 1 following the side impact test.
Figure 3:
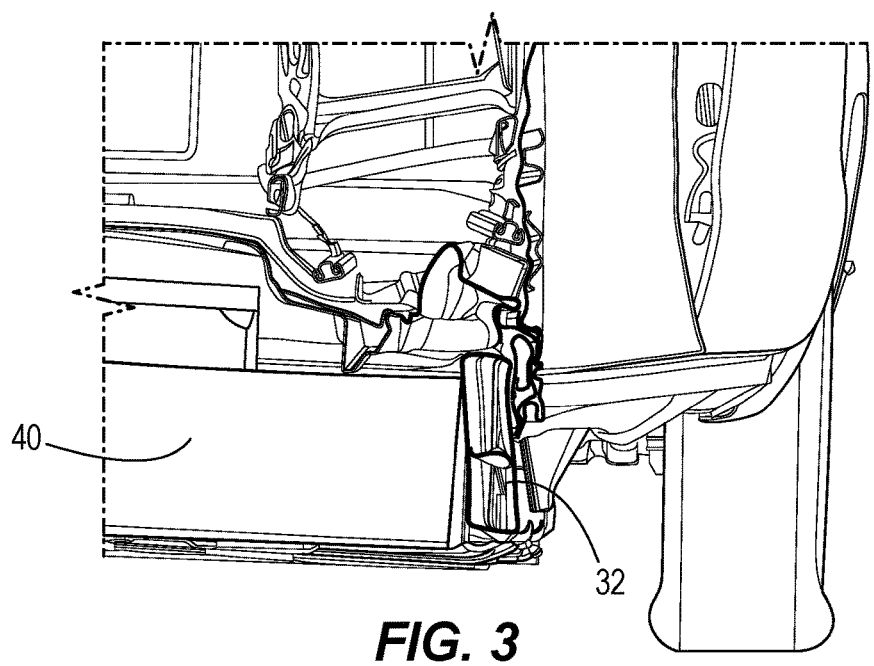
FIG. 3 is a cross-section view of the vehicle of FIG. 2 illustrating damage to a frame side rail such that a battery space for an electric battery pack is impinged upon.

FIGS. 1-3 illustrate an electric or hybrid drive vehicle 20 of conventional construction, as subjected to a rigid pole side impact test. In the illustrated construction, the vehicle 20 is a pick-up truck, for example a full-size, light-duty truck. The vehicle 20 utilizes a body-on-frame construction, including a body 24 defining structures such as an engine bay, a passenger cabin, and a cargo bed, and the vehicle 20 includes a separate frame 28 supporting the body 24. The frame 28 can be a conventional ladder frame, which includes two spaced-apart longitudinal side rails 32 along with a plurality of transverse cross-members 36 connecting the side rails 32. The side rails 32 span the length of the vehicle 20 in the illustrated construction. One or more wheels of the vehicle 20 are driven, at least in part, by an electric motor(s) (not shown) powered by a battery pack 40. The battery pack 40 can include a plurality of rechargeable cells within a case or housing. The battery pack 40 resides at least partially in a battery space defined between the side rails 32. To maximize battery capacity and packaging efficiency, there may be only a small spacing between an outboard side of the battery pack 40 and the corresponding inboard side of the adjacent side rail 32, e.g., less than 50 mm, such as 35 mm in some constructions.

FIGS. 2 and 3 illustrate simulated results of a side impact of the conventional vehicle 20 with a rigid pole, e.g., according to U.S. Dept. of Transportation National Highway Traffic Safety Administration "LABORATORY TEST PROCEDURE FOR FMVSS No. 214, DYNAMIC SIDE IMPACT PROTECTION—Rigid Pole Side Impact Test Requirements", September 2012 (https://www.nhtsa.gov/sites/nhtsa.dot.gov/files/tp214p-01.pdf). The test defines that the vehicle 20 is tested by impacting it into a fixed, rigid pole 46 that is 254 mm (10 inches) in diameter, at any speed up to and including 32 km/h (20 mph). An angle α between the longitudinal center axis A1 of the vehicle 20 and the direction D of the vehicle 20 into the pole 46 is 75 degrees. An axis A2 is parallel to the direction D and extends through both the pole 46 and a point O at the center of gravity (COG) of the head of the test subject occupying the driver's seat. The simulation exemplified in FIGS. 2 and 3, along with other examples herein, utilizes a collision speed of 32 km/h and a vehicle weight of 3210 kg. The vehicle wheelbase according to the example is 3649 mm. The cross-section of FIG. 3 illustrates that the impact of the pole 46 into the side rail 32 causes deflection of the side rail 32 that is sufficient to cause contact between the side rail 32 and the battery pack 40. Although it is possible to design the battery pack 40 with a suitably impact-resistant case or housing, or to further brace the frame 28, particularly between the side rails 32 in the area of the pole impact, one object of the disclosure is to provide a vehicle frame that can withstand the FMVSS No. 214 rigid pole side impact without any contact between the side rail 32 and the battery pack 40. Thus, substantial battery pack protection is provided without reliance on battery pack fortification and without supplementary frame bracing across the battery space.

Figure 5:
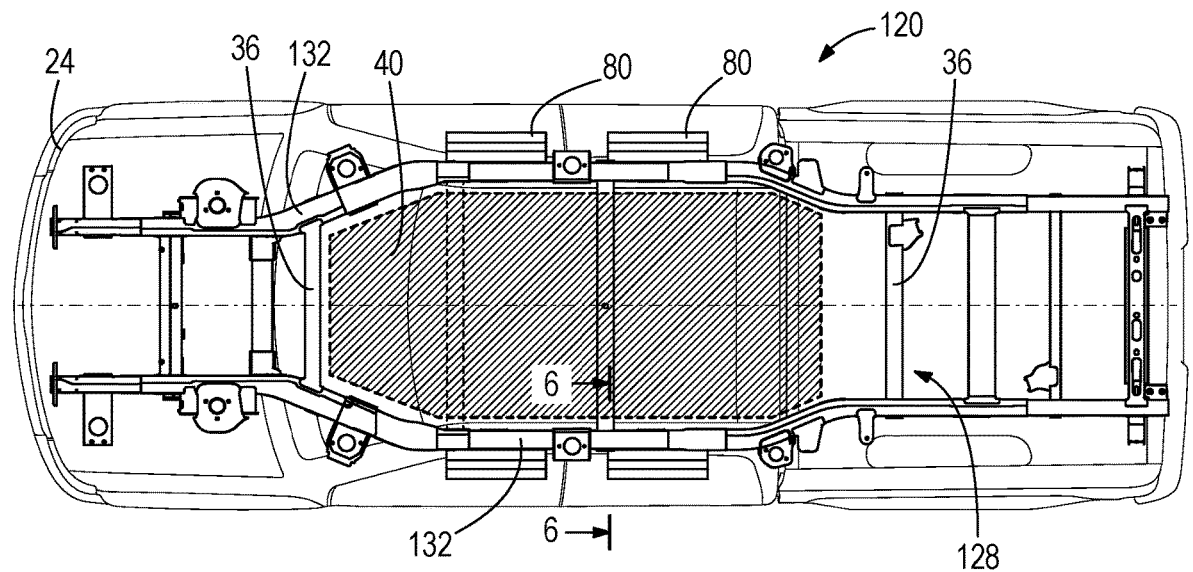
FIG. 5 is a bottom view of a portion of an electric or hybrid drive vehicle having the frame of FIG. 4.
Figure 6:
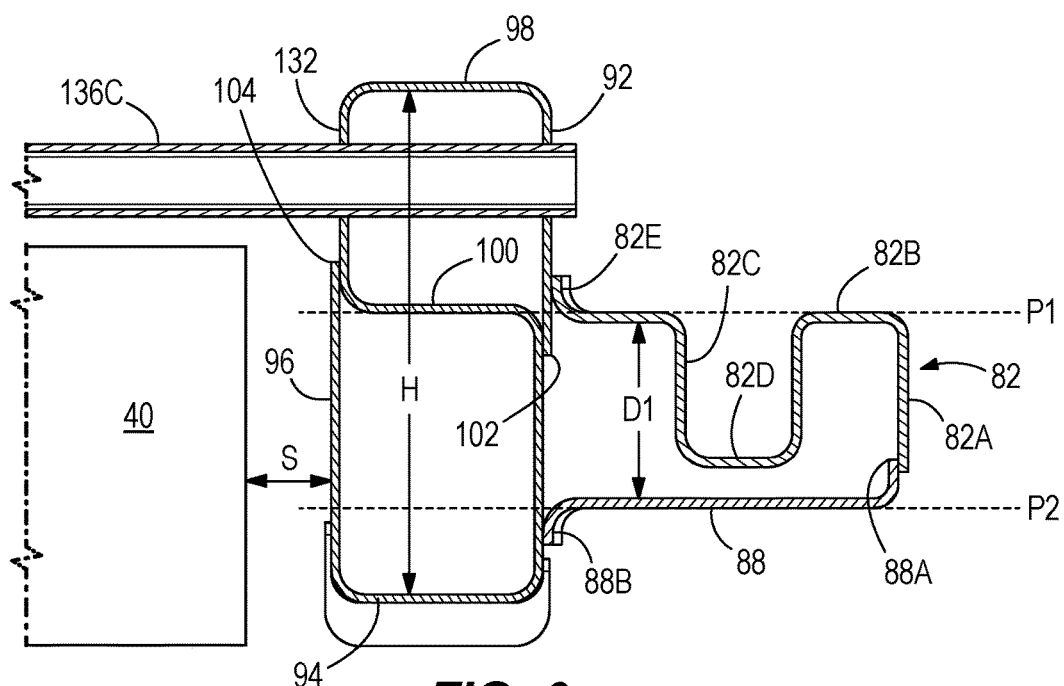
FIG. 6 is a cross-section view of the vehicle of FIG. 5, taken through the side impact absorber.

FIGS. 4-6 illustrate one such vehicle frame 128 in a vehicle 120, wherein the frame 128 includes a side impact absorber 80. Although the side impact absorber 80 can be applied to a frame in various configurations and quantities, the illustrated frame 128 includes two side impact absorbers 80 on each lateral side of the frame 128, one alongside each of a front row and a rear row of the cabin or occupant space (forward and rearward of the vehicle's B-pillar, respectively). On a given lateral side, the side impact absorbers 80 are independent of each other, being only connected together by the frame side rail 32 to which they are separately connected. In other constructions, one side impact absorber 80 may be extended lengthwise to span multiple occupant rows. Likewise, it is conceived to provide additional connection(s) linking multiple side impact absorbers 80 together. The side impact absorbers 80 can be constructed of one or more materials the same as or different from that of the frame 128, particularly the side rails 32 thereof. The side impact absorbers 80, or portions thereof, may be constructed of a suitable alloy of steel or aluminum in some constructions and may be roll-formed, extruded, or stamped. Likewise, the side rails 32, or portions thereof, may be constructed of a suitable alloy of steel or aluminum in some constructions and may be roll-formed, extruded, or stamped.

The vehicle 120 can be similar to the vehicle 20 illustrated in FIGS. 1-3 and described above (e.g., an electric or hybrid drive full-size, light-duty truck, including the body 24). The frame 128 of the vehicle 120 can be similar to the frame 28 except as otherwise noted herein. In general, the frame 128 extends lengthwise, including a pair of width-wise-spaced parallel side rails 132. The side rails 132, which generally mirror each other, can each include a center or mid rail section 132C, identified in FIGS. 9-12 and 15. Although the side rails 132 are not linear from front to rear, at least portions of the two side rails 132 (e.g., including at least the center or mid rail section 132C) may lie in a common horizontal plane. A side impact absorber 80 according to aspects of the present disclosure can be incorporated with a frame having an otherwise conventional construction, or may be incorporated with a frame having other novel features. The side impact absorber 80, as discussed in further detail below, is an additional impact-absorbing structure secured to the frame side rail 132. As such, the side impact absorber 80 can be manufactured separately from the side rail 132 and appended thereto, which makes the side impact absorber 80 suitable for retrofit installation on an otherwise complete frame, such as the frame 28 or the frame 128.

Each of the illustrated side impact absorbers 80 may be entirely or predominantly located on the center or mid rail section 132C, which forms the widest portion of the frame 128 as measured between the side rails 132. A forwardmost portion of the forward side impact absorber 80 may extend past the center rail section 132C onto a front rail section 132F, spanning a joint between the center and front rail sections. A rearmost portion of the rear side impact absorber 80 may extend past the center rail section 132C onto a rear rail section 132R, spanning a joint between the center and rear rail sections. Notably, the side impact absorbers 80 can help facilitate an increased maximum internal frame width (defined as the spacing distance between the side rails 132)

compared to the frame 28, which expands the space available for the battery pack 40. Such spacing may be over 1000 mm, over 1100 mm, or over 1200 mm in some constructions. The corresponding vehicle body width at this/these location(s) can be less than 2100 mm, or less than 2030 mm, or less than 1960 mm. Moving the side rails 132 laterally outward in this way subjects the side rails 132 to an earlier and overall increased participation in receiving impact loads during side impact collision (e.g., FMVSS No. 214 or other), thus necessitating more advanced design in order to provide similar resistance to deformation into the battery space. The design features contemplated herein attempt to solve these concerns without resorting to rudimentary upsizing of the side rails 132 in cross-section and/or wall thickness, which immediately leads to substantial increase in weight.

The forward side impact absorber 80 may be wholly or partially forward of the B-pillar 86 of the vehicle body 24. The rear side impact absorber 80 may be wholly or partially rearward of the B-pillar 86. The B-pillar 86 is labeled on the vehicle 20 of FIG. 1. As shown in both the frame 28 of FIGS. 1-3 and the frame 128 of FIGS. 4-6, a central frame cross-member 36C, 136C can be located at the longitudinal position of the B-pillar 86. However, the central frame cross-member 136C of the frame 128 can have a different configuration than the central frame cross-member 36C of the frame 28 to accommodate an increase in unobstructed battery pack space. The central frame cross-member 136C at the B-pillar location can be one of two central frame cross-members 136C extending between the left and right center rail sections 132C. See for example the additional central frame cross-member 136C, shown in dashed lines, which is spaced forwardly of the B-pillar cross-member 136C. However, the number of central frame cross-members 136C can be zero, one, or even more than two. Although the cross-section profile of the side rail 132, particularly the center section 132C, is described in further detail below, it is initially noted that the profile may be a hollow box-shaped profile including an outboard sidewall 92, a bottom wall 94, an inboard sidewall 96, and a top wall 98. As best shown in FIGS. 4A and 6, each of the central frame cross-members 136C can have a hollow construction and can be arranged to extend through both the outboard and inboard sidewalls 92, 96 on each side rail 132. The central frame cross-members 136C can both be positioned exclusively in the upper portion of the side rails 132 (e.g., upper 35 percent or upper 25 percent of total side rail height at that longitudinal position) to avoid the need to segment the battery pack 40 into forward and rearward sections. The two central frame cross-members 136C can have similar size and construction or may have unique size and/or construction as compared to each other. For example, the central frame cross-member 136C nearer the longitudinal center and nearer the B-pillar 86 can have a comparatively larger cross-section area, while wall thickness can be the same or different.

Figure 7:
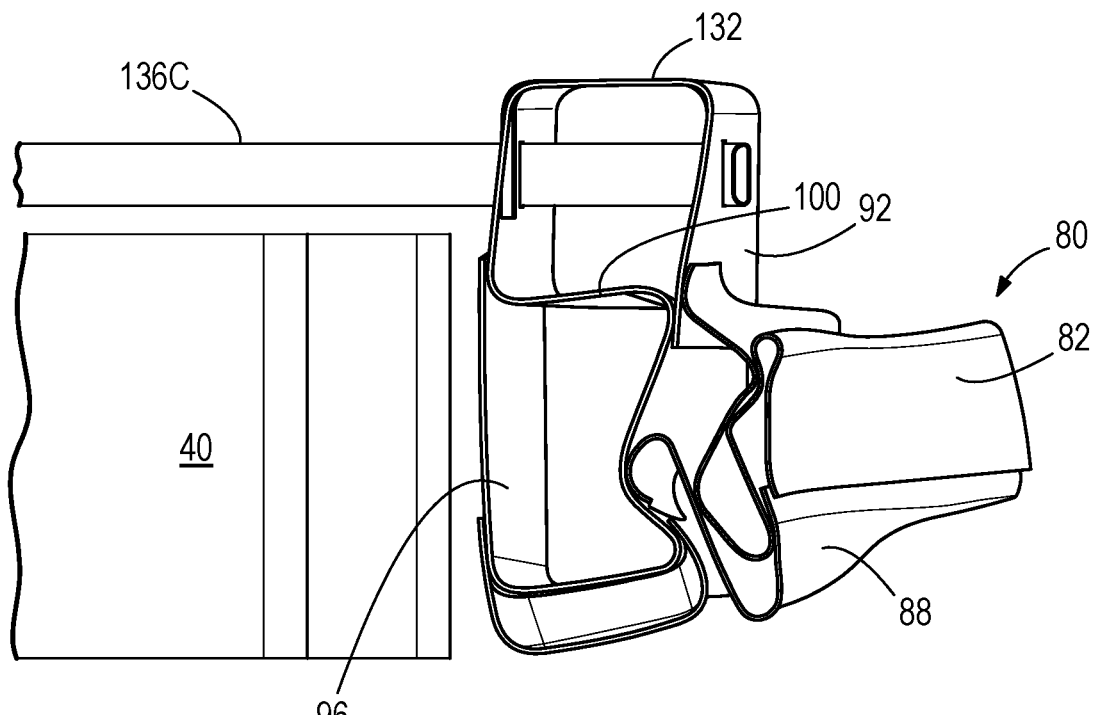
FIG. 7 is a post-crash cross-section through the side impact absorber.
Figure 8:
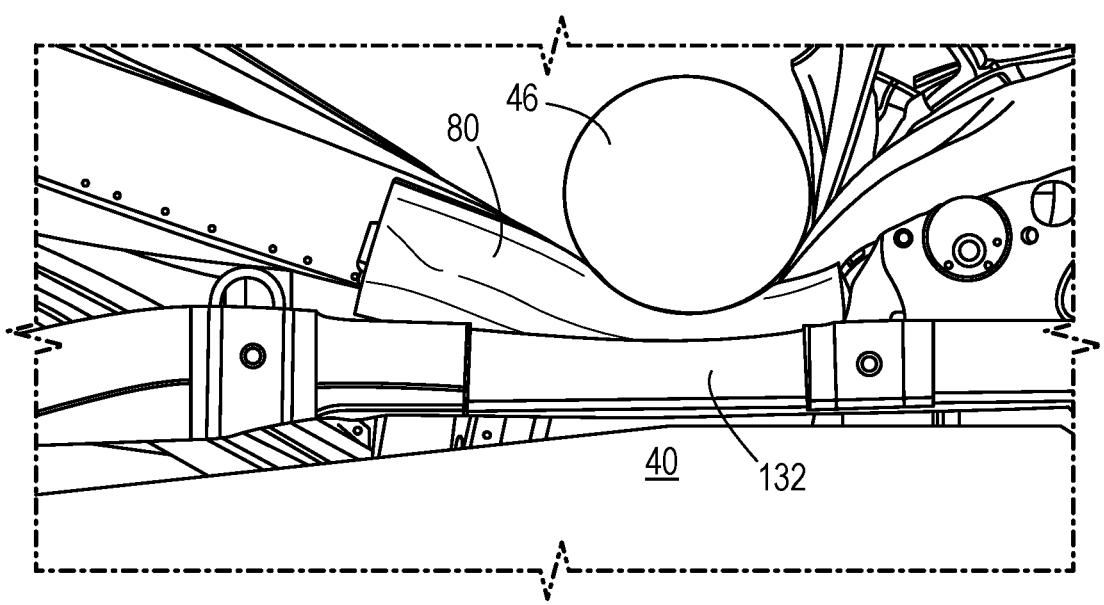
FIG. 8 is a post-crash bottom plan view of the side impact absorber.

The addition of the side impact absorber 80 allows the frame 128 to function in the FMVSS No. 214 rigid pole impact test, among other side impact collisions, with two separate functional zones—a rigid zone (i.e., the side rail 132) to provide support, and an energy absorption zone (i.e., the side impact absorber 80). Although some energy is transferred through the side impact absorber 80 to the side rail 132 in the event of a side impact with the side impact absorber 80, the side impact absorber 80 operates as a sacrificial or shielding structure to absorb enough crash energy that the side rail 132 is inhibited from deflecting toward the battery space having the battery pack 40. In some constructions, the side impact absorber 80 operates in conjunction with the side rail 132 to maintain a clearance between the side rail 132 and the battery pack 40 throughout the side impact collision specified by FMVSS No. 214 (see simulation results in FIGS. 7 and 8), i.e., avoiding any contact therebetween, despite a small initial (pre-collision) lateral spacing S. The lateral spacing S (FIG. 6) between the battery pack 40 and the side rail 132 can be less than 50 mm, and in some cases less than 40 mm (e.g., 35 mm). The lateral spacing S can be at least 5 mm. In other constructions, the side impact absorbers 80 can help achieve, for a side impact collision specified by FMVSS No. 214, a contact force between the side rail 132 and the battery pack 40 that is at or less than a prescribed value (e.g., less than 40 kN, less than 20 kN, or less than 10 kN). In order to meet the desired design goals as stated above, the side impact absorber 80 includes at least two different types of structures having independent connections with the side rail 132. Namely, these include a wave member 82 coupled to the outboard sidewall 92 of the side rail 132 and a reinforcing member 88 that is vertically-spaced from the wave member 82 and separately coupled to the outboard sidewall 92. The reinforcing member 88 is spaced below the wave member 82 as illustrated so that it is nearer to the bottom wall 94 of the side rail 132 (e.g., adjacent the bottom wall 94). All or a majority of the side impact absorber 80 has a uniform construction along the longitudinal direction.

In some constructions, the wave member 82 can be coupled to the outboard sidewall 92 within a central portion of the height H of the sidewall 92, the central portion being outside of the top 20 percent of the height H and outside of the bottom 20 percent of the height H. The reinforcing member 88 is coupled to the side rail 132 within the bottom 20 percent of the height H. The height H refers to the height of the sidewall 92 and/or the side rail 132 overall at the location of the side impact absorber 80. In some constructions, the reinforcing member 88 can be coupled to the outboard sidewall 92 in-line with the bottom wall 94, or alternately, coupled to the bottom wall 94 (e.g., having a portion extending laterally across all or a part of the bottom wall 94). The arrangement of the side impact absorber 80 defines multiple parallel load paths to the side rail 132. The outboard sidewall 92 can be a vertically-extending exterior sidewall having a laterally-facing outer side for attachment of the wave member 82, and the outboard sidewall 92 can extend parallel to the inboard sidewall 96 at an offset distance defining the side rail width. The bottom wall 94 extends laterally inward, toward the central axis A1, from a bottom of the outboard sidewall 92. The bottom wall 94 connects the two spaced sidewalls 92, 96 of the side rail 32. As described below, the wave member 82 defines a softer or weaker load path than the reinforcing member 88—in other words, the wave member 82 buckles at a lower load than the reinforcing member 88. This strategy is employed so that each part of the side impact absorber 80 can absorb as much energy as possible without transmitting such loads to the side rail 132 as to cause substantial damage in the form of crushing and/or inward deflection. The outboard sidewall 92 exhibits substantially more crushing or buckling resistance under side load at the locations adjacent the top and bottom walls 98, 94 as compared to the height-wise central portion, and this necessitates a softer load path in the wave member 82.

The wave member 82 has a wave-form shape when viewed from the front or back of the frame 128, parallel to the axis A1, such as in the cross-section of FIG. 6. The wave member 82 defines a vertically-extending outboard portion or wall 82A, along with peak and trough portions that extend laterally inboard therefrom toward the outboard sidewall 92 of the side rail 132. The wave member 82 can be a continuous sheet, including the outboard wall 82A, at least two peak portions 82B, at least one trough portion 82D spaced vertically below the peak portions 82B, and vertically-extending interconnectors 82C between the trough portion 82D and adjacent peak portions 82B. The peak portions 82B have straight segments extending in a first reference plane P1 perpendicular to the axis A1 and provided to intersect the central portion of the side rail 132. However, the shape of the wave member 82 prevents having a straight continuous load path that spans the side impact absorber 80, instead presenting multiple distinct portions of the wave member 82 (the peak portions 82B) that lie along the first reference plane P1. The first reference plane P1 defines a first "soft" load path from the outboard end of the side impact absorber 80 to the side rail 132. The reinforcing member 88 has a straight segment extending in a second reference plane P2 parallel to and spaced below the first reference plane P1, thus defining a second "stiff" load path from the outboard end of the side impact absorber 80 to the side rail 132 ("soft" and "stiff" being comparative terms referring to the difference in energy absorption capacity or buckling resistance under side impact loading). The wave member 82 is secured (e.g., by welding) to the side rail 132 at an inboard-most portion 82E, which in the case of the illustrated construction is a flared flange extending from the inboard peak portion 82B. The distance between the valley portions and the peak portions define a depth D1 of the wave member 82. The depth D1 can form a majority of the overall height of the side impact absorber 80. An outboard end of the wave member 82, e.g., at a bottom of the outboard wall 82A, may be secured to an outboard end 88A of the reinforcing member 88. For example, securement of the wave member 82 can be provided by welding directly to the reinforcing member 88. As used herein, "vertically-extending" can refer to vertical walls as illustrated by the walls 82A, 82C or other walls that extend vertically, e.g., where the "U" shape of the wave member 82 is replaced by a "V" or other shape. Variations in the sizes and shapes of the wave member 82 and the side impact absorber 80 as a whole are within the spirit and scope of the present disclosure. In one construction, the wave member 82 is constructed of a strip of steel sheet. In some constructions, a suitable steel for construction of the wave member 82 is Docol® 800CP available from SSAB. The yield strength of the wave member material can be 570 to 720 MPa. An exemplary sheet thickness is 4.0 mm. The sheet thickness of the wave member 82 may exceed that of the side rail 132 (e.g., 3.4 mm). However, other materials and sheet thicknesses are optional for the wave member 82.

Rather than being wave-formed, the reinforcing member 88, between its outboard and inboard ends 88A, 88B, has a flat or straight cross-sectional shape taken perpendicular to the axis A1, although the reinforcing member 88 may be ribbed, corrugated, etc. in some constructions. For example, the reinforcing member 88 may be secured to the side rail 132 by welding the inboard end 88B to the side rail 132 adjacent the bottom wall 94. In some constructions, the inboard end 88B (e.g., flared flange) is secured to the side rail 132 by welding. The material construction of the reinforcing member 88 can be the same as or different from the wave member 82. In some constructions, the reinforcing member 88 is constructed of a material having a yield strength at least 25 percent or at least 40 percent greater (e.g., 50 percent greater) than that of the material of the wave member 82. In some constructions, the material of the reinforcing member 88 has a yield strength less than double that of the material of the wave member 82. In some constructions, a suitable steel for construction of the reinforcing member 88 is Docol® 1200CP available from SSAB. The yield strength of the reinforcing member material can be 900 to 1100 MPa. The sheet thickness of the reinforcing member 88 is 4.0 mm in some constructions. The sheet thickness of the reinforcing member 88 may exceed that of the side rail 132 (e.g., 3.4 mm).

Although the side impact absorber(s) 80 can be implemented on a frame having a conventional side rail construction of a simple box-shaped open cross-section, the illustrated side rails 132, at least within the center sections 132C, include an alternate construction including an internal brace 100 between the outboard and inboard sidewalls 92, 96. The internal brace 100 allows the side rail 132 to accept even higher loads through the "soft" load path of the wave member 82 than would otherwise be possible with a simple open cross-section. Returning to FIG. 6, the internal brace 100 is embodied as a portion of an integral single sheet of material forming the profile of the side rail 132. The side rail 132 can be manufactured by roll-forming into the configuration shown in the cross-section of FIG. 6, including all exterior walls (92, 94, 96, 98) plus the internal brace 100 formed of the continuous single sheet. The configuration may be described as an "8" shape or "closed S" shape. This configuration results in the sheet contacting itself to define sheet overlap along each of the outboard and inboard sidewalls 92, 96, only where ends 102, 104 of the roll-formed sheet form seams that extend lengthwise. The seams can be partially or fully seam welded to secure the profile shape of the side rail 132. The internal brace 100 is positioned within the central portion of the outboard (and inboard) side wall 92, i.e., outside of the top 20 percent of the height H and outside of the bottom 20 percent of the height H. The internal brace 100 can be positioned in the plane P1 defined by the peaks of the wave member 82. The plane P1 can be centered within the height of the side rail 132 or offset as shown, e.g., slightly above center. The ends 102, 104 of the side rail sheet, and thus the corresponding seams, can be spaced apart at different vertical heights. As illustrated, the end 104 at the inboard side is higher than the end 102 at the outboard side. The seam formed at one of the ends (e.g., end 104, inboard) can be positioned vertically higher than the plane P1, and the seam formed at the other end (e.g., end 102, outboard) can be positioned vertically below the plane P1. In some constructions, a suitable steel for construction of the side rail 132, including at least the center section 132C, is Docol® 1500M available from SSAB. The yield strength of the side rail material can be 1220 to 1520 MPa. Thus, the side rail can be constructed of a material having a yield strength that exceeds the yield strength of the material of the reinforcing member 88.

Figure 9:
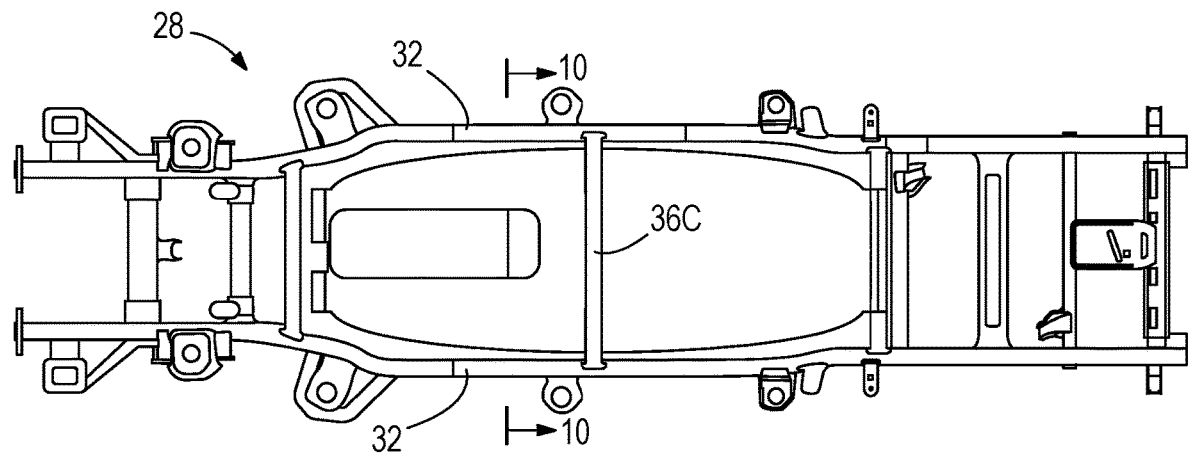
FIG. 9 is a plan view of the frame without the side impact absorber.
Figure 10:
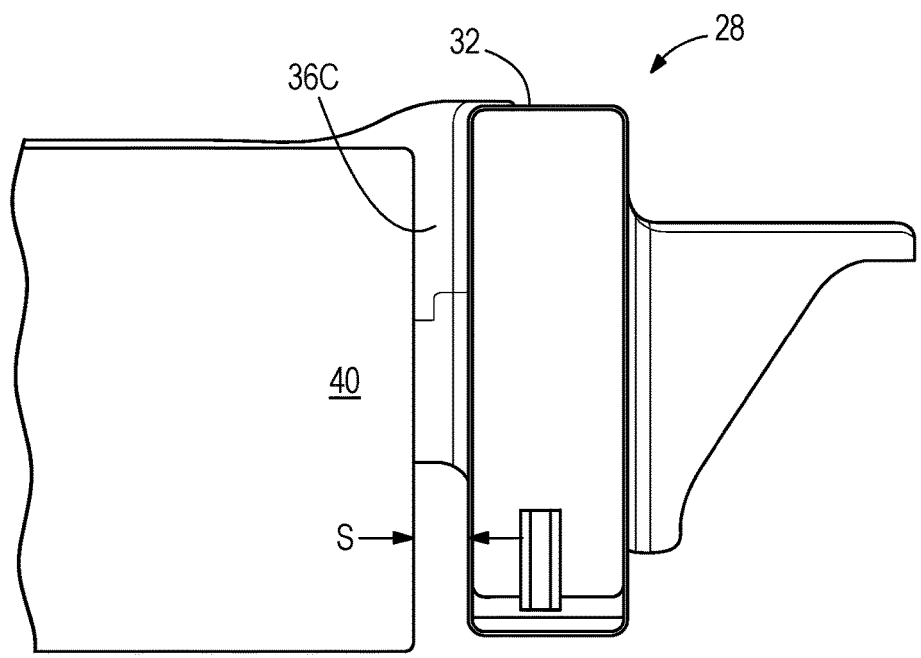
FIG. 10 is a cross-section taken through the side rail, center rail portion, of the frame of FIG. 9.
Figure 11:
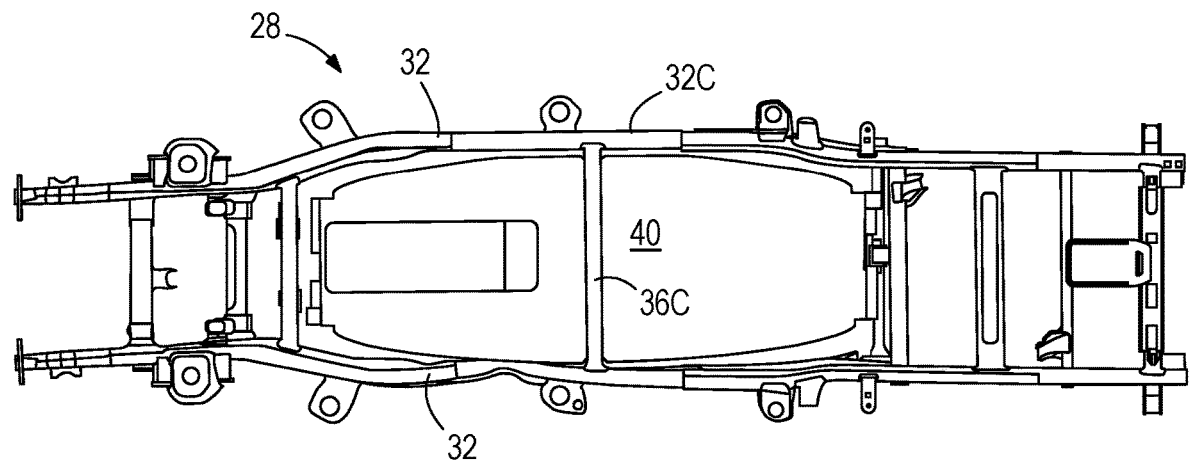
FIG. 11 is a plan view of the frame without the side impact absorber, showing side impact damage.
Figure 11A:
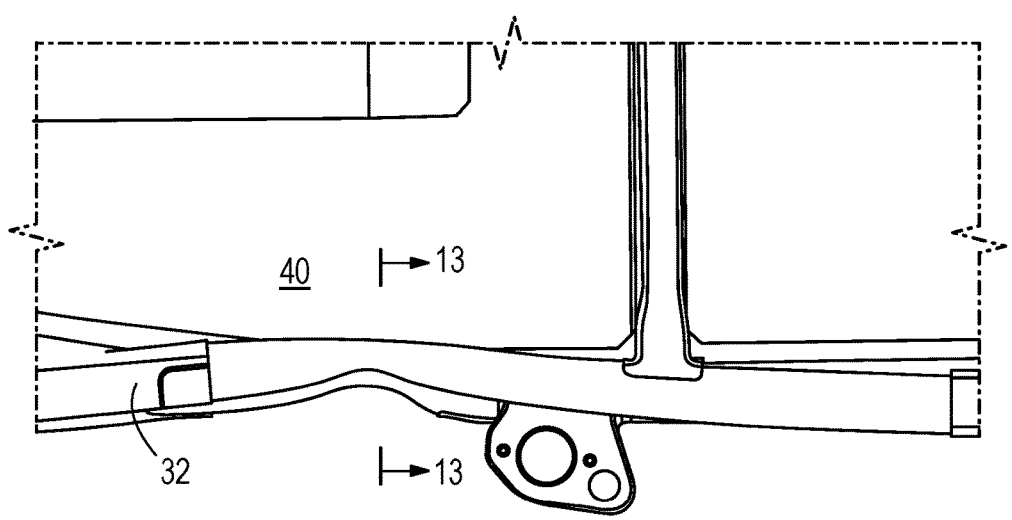
FIG. 11A is a detail view of the impact area of the frame of FIG. 11.
Figure 12:
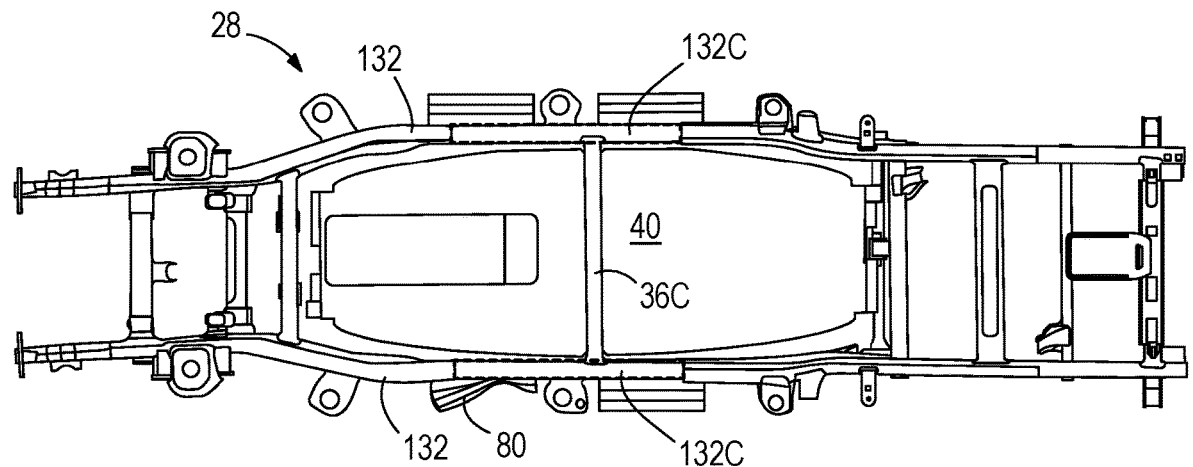
FIG. 12 is a plan view of the conventional frame modified to include the side impact absorber, showing reduced side impact damage.
Figure 12A:
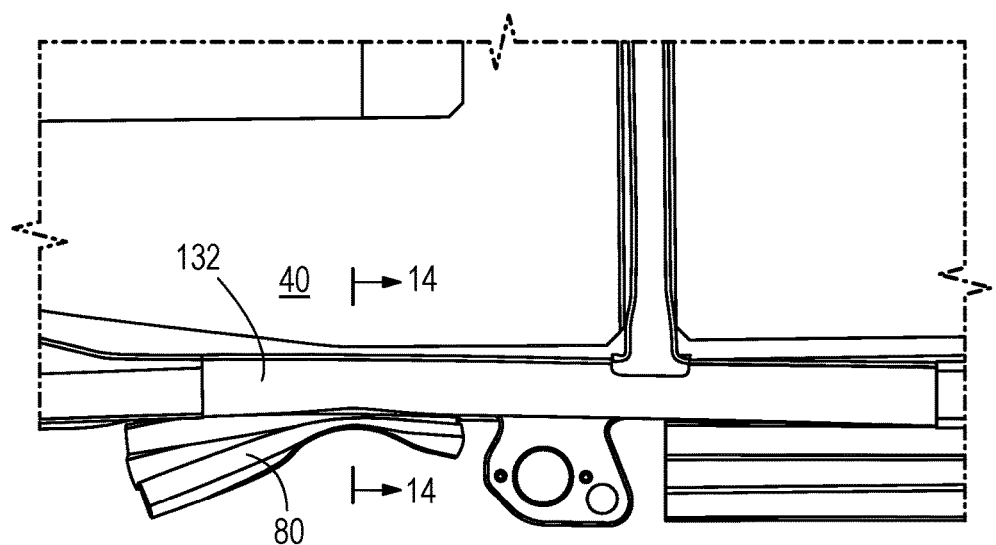
FIG. 12A is a detail view of the impact area of the modified frame of FIG. 12.
Figure 13:
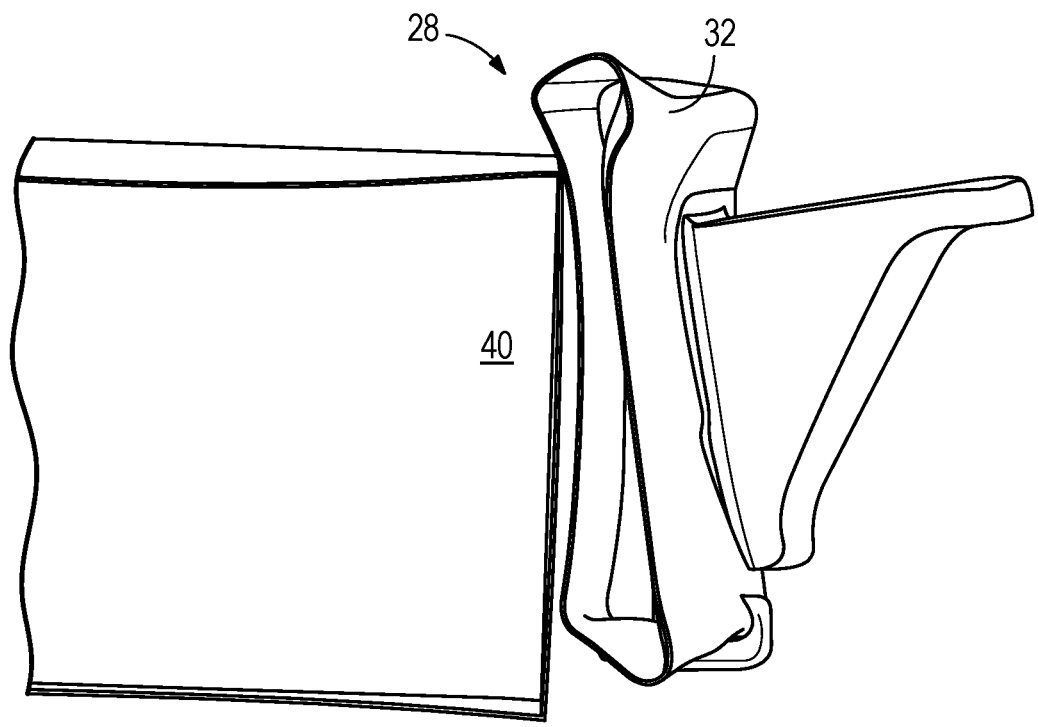
FIG. 13 is a post-collision cross-section view of the conventional frame side rail without the side impact absorber.
Figure 14:
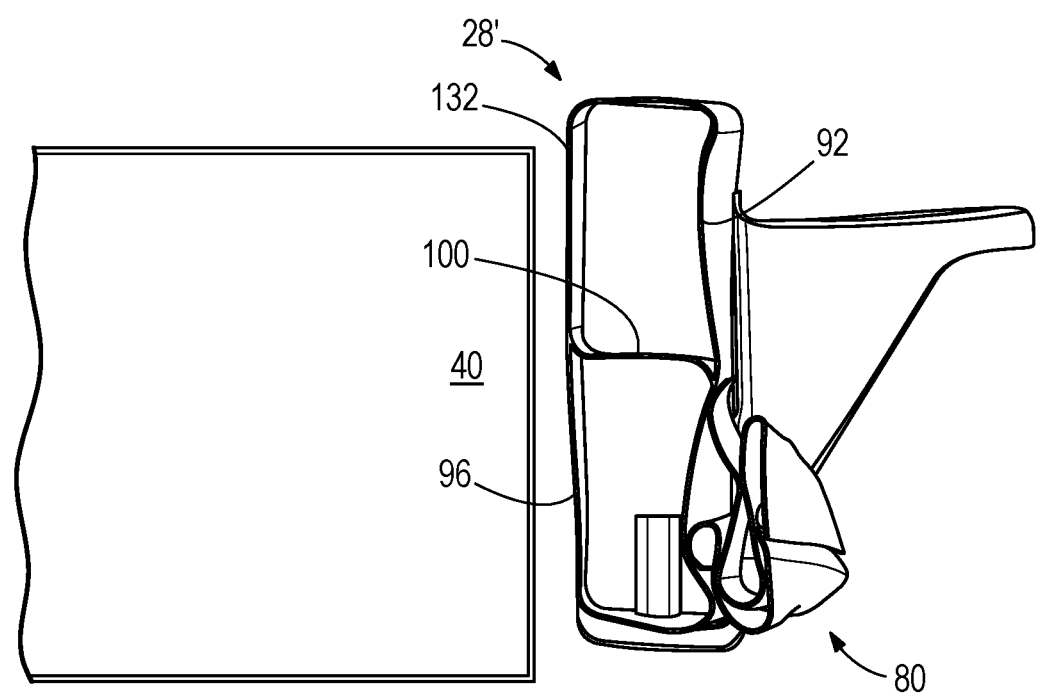
FIG. 14 is a post-collision cross-section view of the frame side rail of the frame of FIGS. 12 and 12A with the side impact absorber.
Figure 16:
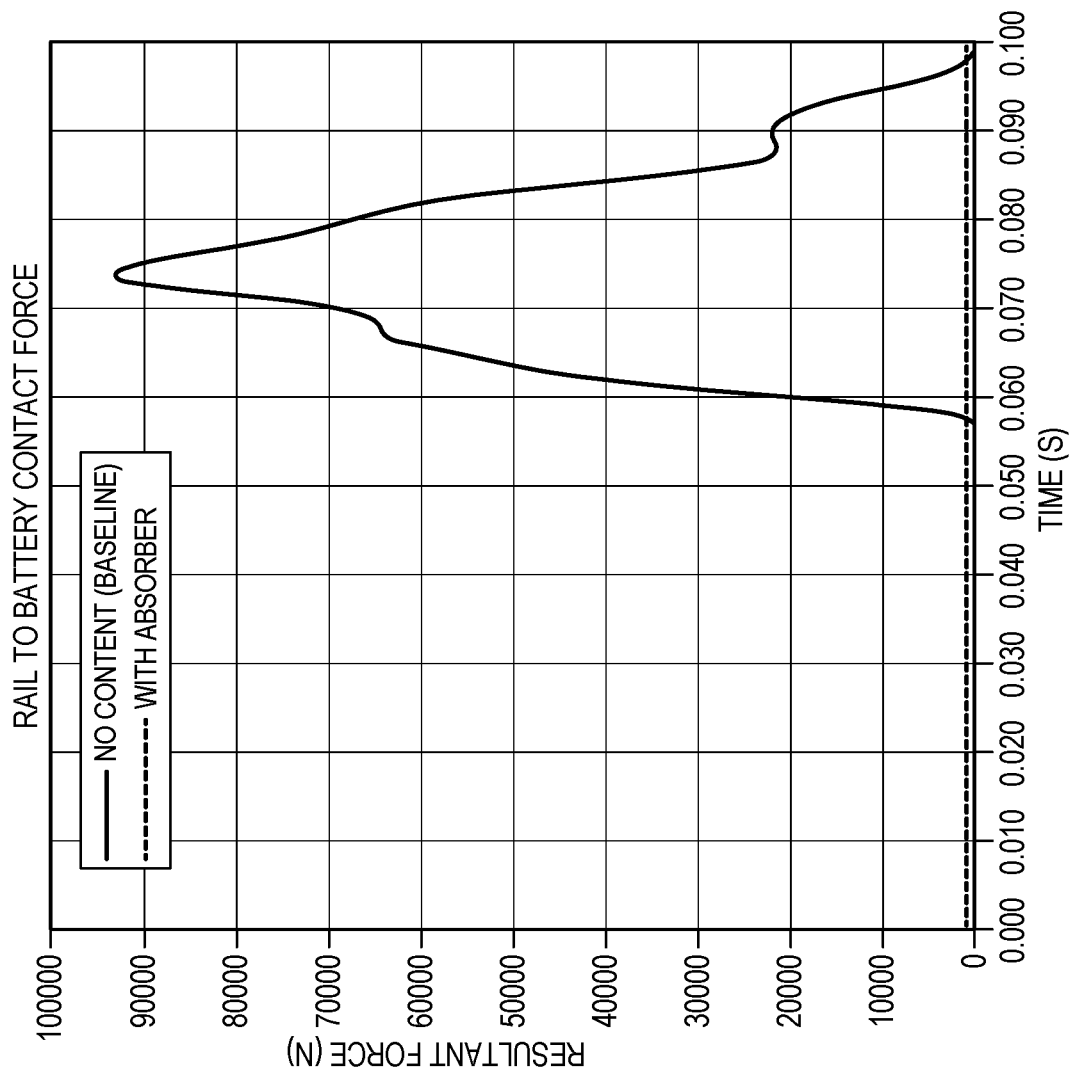
FIG. 16 is a graph of resultant side rail to battery pack contact force vs. time for side impacts of the frames of both FIGS. 11, 11A and the frame of FIGS. 12, 12A, without and with the side impact absorber, respectively.
Figure 15:
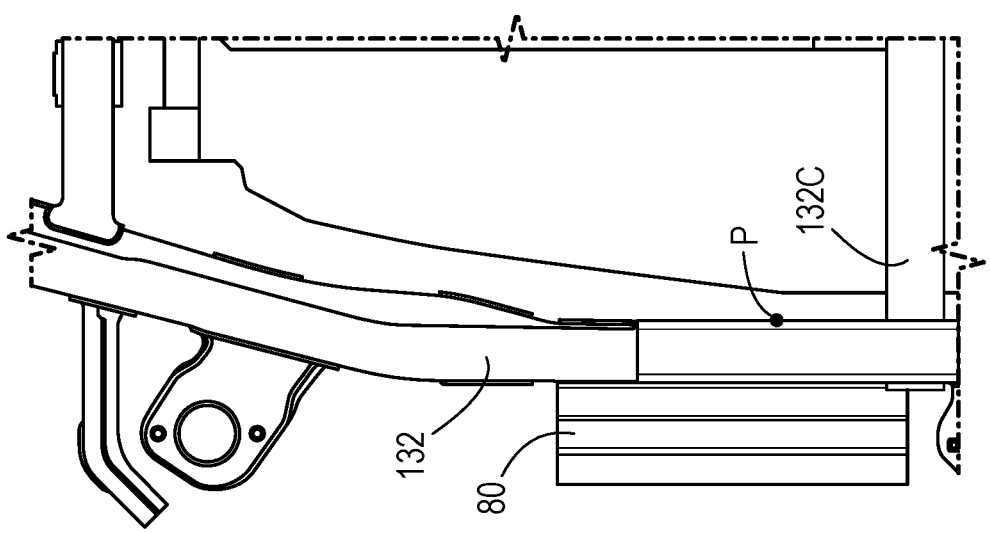
FIG. 15 is a plan view of a portion of the modified frame of FIGS. 12, 12A, and 14, illustrating the spacing between the interior of the side rail and the battery pack, along with a contact force measurement location.

FIGS. 9 and 10 illustrate the conventional frame 28 (without side impact absorber 80) before the FMVSS No. 214 rigid pole side impact, and FIGS. 11, 11A, and 13 illustrate the simulated damage to the conventional frame 28 after said impact. As a reminder, the side rails 32 of the conventional frame 28 are set closer together than the side rails 132 of the frame 128, and thus vehicle body deformation eases the loads on the side rails 32. The conventional frame 28 includes the central frame cross-member 36C that is at least half as tall as the side rails 32 such that the battery pack space is divided or penetrated by the central frame cross-member 36C. As shown in FIGS. 10 and 13, the side rails 32 have a conventional hollow box cross section. FIGS. 12, 12A, and 14 are detail views of a modified frame 28' that includes only some of the features of the frame 128 for the sake of demonstrating efficacy during a simulated rigid pole side impact according to the specifications of the FMVSS No. 214 rigid pole impact test. The modified frame 28' has the same narrow side rail spacing as the conventional frame 28 and the same conventional central frame cross-member 36C. However, the modified frame 28' includes the side impact absorbers 80 as disclosed in the description of the frame 128, and the modified frame 28' has an internally-braced side rail construction like the side rail 132 shown in FIG. 6. In general, it can be immediately seen that the side impact absorber 80 is successful in inhibiting substantial damage to the side rail 132, which in turn prevents deflection of the side rail 132 into the battery space (see zero force (0 kN) registered on the side of the battery pack 40 throughout the impact in the graph of FIG. 16). In the absence of the side impact absorber 80 and the internally-braced side rails 132, the conventional frame 28 allows contact between the side rail 32 and the battery pack 40 (see FIGS. 11A and 13 along with the 94 kN force shown in the graph of FIG. 16), which represents a maximum deflection of the side rail 32 (as measured at inner sidewall) of at least the full spacing distance S, e.g., 35 mm in the illustrated construction. The measurements are taken at a reference point P (FIG. 15) on the inside of the side rail located longitudinally at the location of the pole impact according to the FMVSS No. 214 rigid pole impact test. The side impact absorber 80 limits deflection of the side rail 132 to less than 35 mm, and in some cases less than 25 mm, or less than 12.5 mm. As shown in FIGS. 12A and 14, the integrity of the side rail 132 in the modified frame 28' with the side impact absorber 80 is maintained. Despite some nominal deformation, the side rail 132 does not buckle or collapse, and instead the outboard and inboard sidewalls 92, 96 remain spaced apart.

As described above, one aspect of the disclosure that provides the significant performance advantages demonstrated by the simulation results of FIGS. 7, 8, 12, 12A, 14 and 16 is the establishment of both a first load path (soft path through wave member 82) and the parallel (e.g., lower) load path (stiff path through reinforcing member 88), each load bath balanced with the portion of the side rail 132 to which it is secured to avoid buckling. In other words, the stiffer load path is established to a stiffer part of the side rail 132 with respect to horizontal buckling, adjacent the bottom wall 94. Neither load path is so stiff as to enable transmission of loads to the side rail 132 that would buckle or collapse that directly-connected portion of the side rail 132. Notably, the components of the side impact absorber 80 can be integrated into the frame 128 without involving the vehicle body 24 or battery attachments. The side impact absorber 80 allows the frame 128 to protect the battery pack 40 in a side impact such as the FMVSS No. 214 rigid pole impact test, without the use of any central cross-member between the side rails 132 that divides or penetrates the battery zone (e.g., central cross-members 136C extend exclusively above the battery pack 40). The side impact absorber 80 does not affect overall vehicle package size, but rather works within its existing package. Although features of the frames 128, 28' avoid or limit direct side rail contact to the battery pack 40 upon collision, these features can likewise be implemented to provide a "controlled space" or "protection zone" within the side rails 132 for another component(s).

Figure 17:
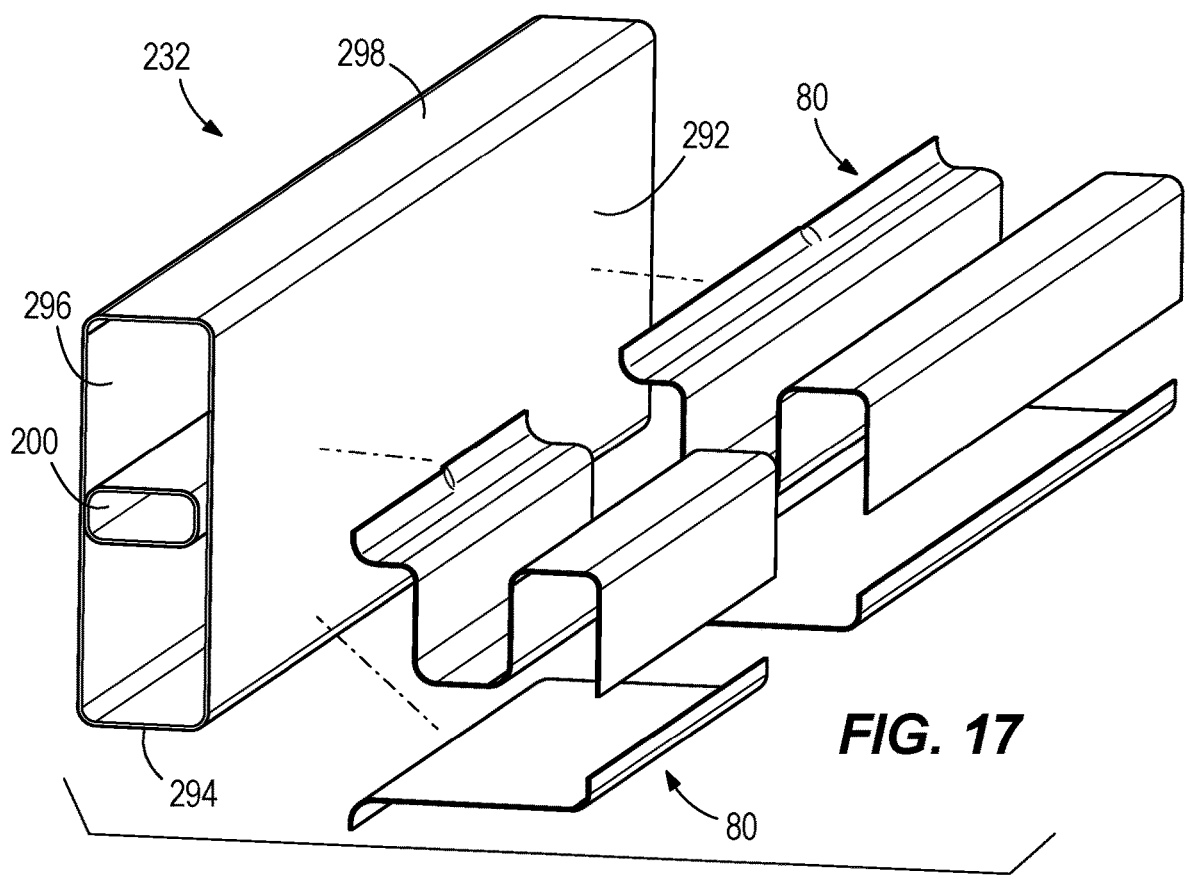
FIG. 17 is a partial exploded view of a portion of a vehicle frame including the multi-member side impact absorber and a rail construction according to another embodiment of the present disclosure.
Figure 18:
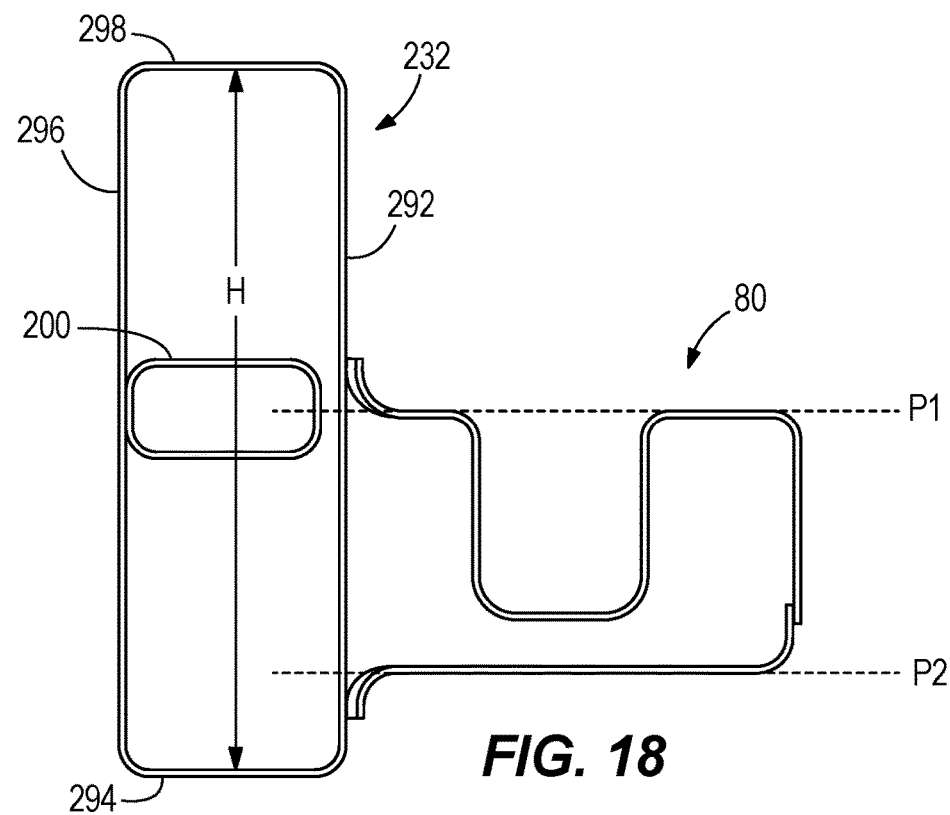
FIG. 18 is a cross-section view of the frame portion of FIG. 17.

FIGS. 17 and 18 illustrate the side impact absorbers 80 applied to a side rail 232 having a construction that differs in some respects to those described above and illustrated in the preceding figures. As with the other constructions, the side rail 232 having the side impact absorbers 80 can be a center or mid rail section of the frame, which can be a frame for the body-on-frame construction of a hybrid or electric vehicle. Except as noted herein, the side rail 232 and the side impact absorbers 80 can have the features and functions as noted in the preceding description and drawings. As opposed to having a single integral roll-formed sheet forming both the outer walls and an internal brace 100 as shown in FIG. 6, the side rail 232 of FIGS. 17 and 18 includes an internal brace 200 that is formed separately from and placed inside an outer box portion of the side rail 232. The outer box portion includes an outboard sidewall 292, a bottom wall 294, an inboard sidewall 296, and a top wall 298. The internal brace 200 can be positioned along the plane P1 of the soft load path, which may be at the midpoint of the height H of the side rail 232. The illustrated internal brace 200 is of rectangular tubular cross-section. The internal brace 200 has opposing sidewalls, one or both of which contacts an inner surface of the respective sidewall 292, 296 of the outer box portion of the side rail 232. In some constructions, the internal brace 200 is secured (e.g., welded) to only one of the two sidewalls, in particular the inboard sidewall 296. That said, the internal brace 200 fills all or a majority (e.g., at least 50 percent, at least 75 percent, or at least 90 percent) of the lateral spacing between the sidewalls 292, 296 of the outer box portion of the rail 232. Top and bottom walls of the internal brace 200 connect the respective sidewalls of the internal brace 200. Measured parallel to the height H of the side rail 232, the height of the internal brace 200 can be less than one-quarter of the height H. The width of the internal brace 200 may exceed its height (e.g., defining a width to height ratio of 1.5:1 or greater). The plane P1 of the soft load path of the side impact absorber 80 can be aligned with one of the top and bottom walls of the internal brace 200, or can alternately be situated to extend between the top and bottom walls of the internal brace 200 (e.g., at equal or unequal distances therefrom).

Figure 19:
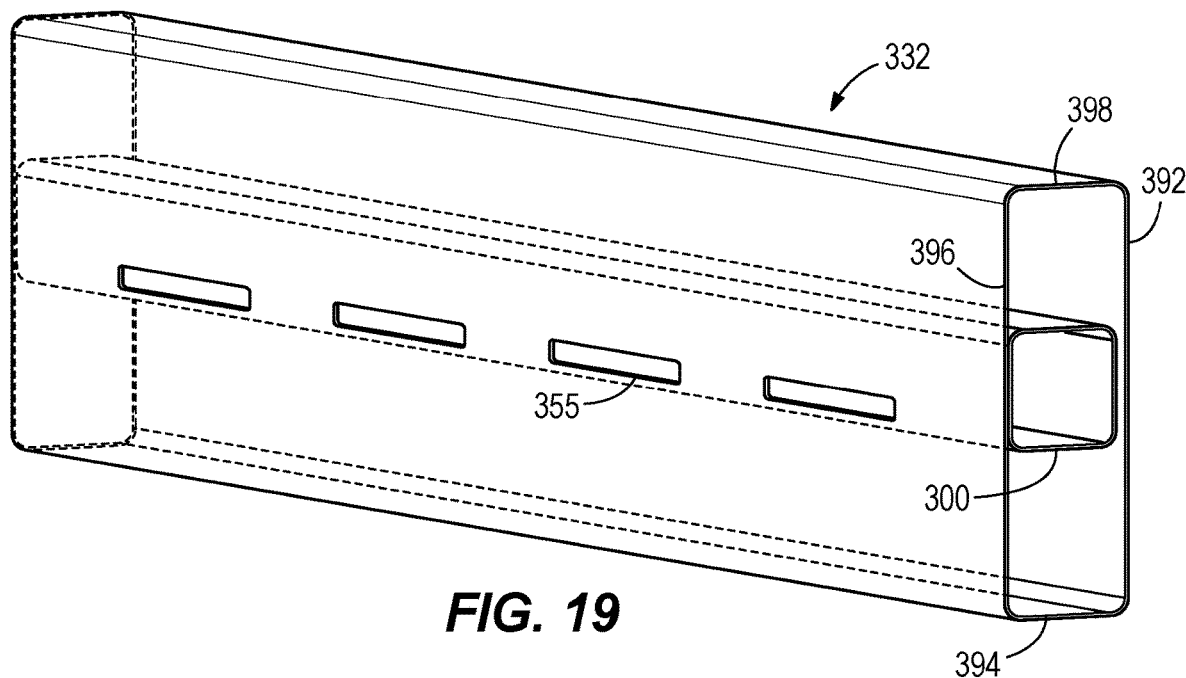
FIG. 19 is a perspective view of a portion of a vehicle frame including the multi-member side impact absorber and a rail construction according to yet another embodiment of the present disclosure.
Figure 20:
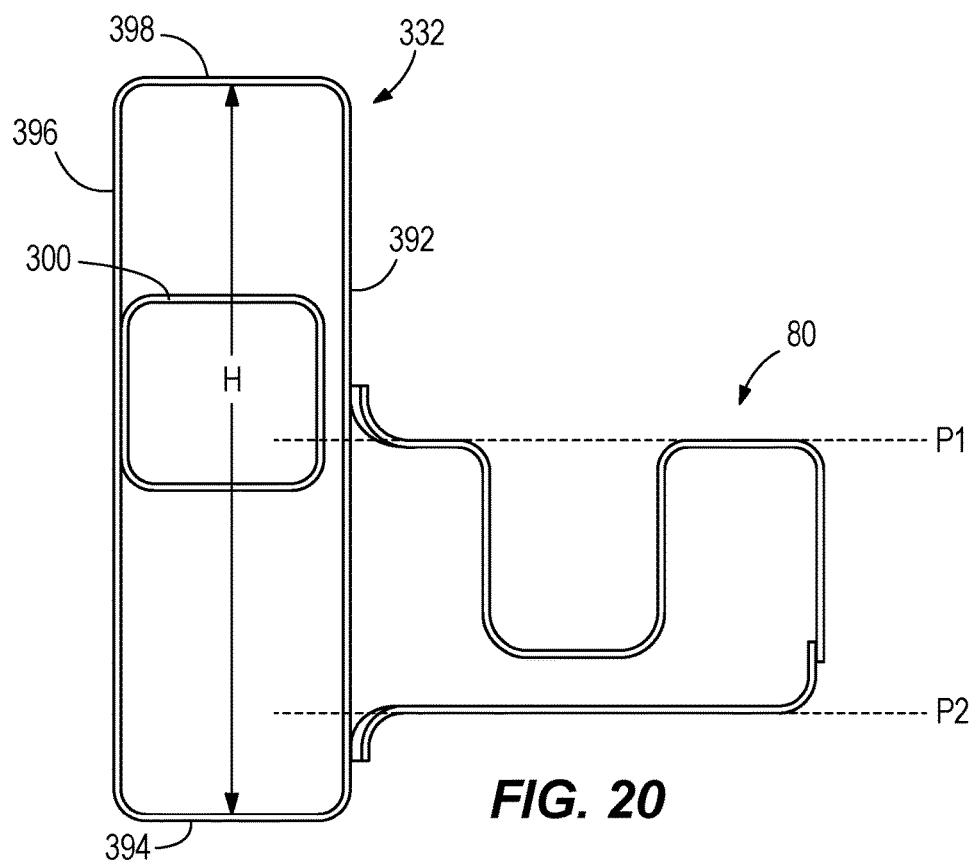
FIG. 20 is a cross-section view of the frame portion of FIG. 19.

FIGS. 19 and 20 illustrate the side impact absorbers 80 applied to a side rail 332 having yet another alternate construction, which again can be a center or mid rail section of the frame, which can be a frame for the body-on-frame construction of a hybrid or electric vehicle. In particular, the side rail 332 is similar to the side rail 232, except as noted herein. As such, the side rail 332 of FIGS. 19 and 20 includes an internal brace 300 that is formed separately from and placed inside an outer box portion of the side rail 332 provided by the outboard sidewall 392, bottom wall 394, inboard sidewall 396, and a top wall 398. The internal brace 300 can be positioned along the plane P1 of the soft load path, which may be at the midpoint of the height H of the side rail 332. The illustrated internal brace 300 is again of rectangular tubular cross-section, but in this instance having less disparity between its height and width. In fact, the internal brace 300 may have a square cross-section profile with equal height and width. As used herein, "rectangular" and "square" allow for corner rounding as shown. The internal brace 300 has opposing sidewalls, one or both of which contacts an inner surface of the respective sidewall 392, 396 of the outer box portion of the side rail 332. In some constructions, the internal brace 300 is secured (e.g., welded) to only one of the two sidewalls, in particular the inboard sidewall 396. That said, the internal brace 300 fills all or a majority (e.g., at least 50 percent, at least 75 percent, or at least 90 percent) of the lateral spacing between the sidewalls 392, 396 of the outer box portion of the rail 332. Top and bottom walls of the internal brace 300 connect the respective sidewalls of the internal brace 300. Measured parallel to the height H of the side rail 332, the height of the internal brace 300 can be less than one-third of the height H.

The plane P1 of the soft load path of the side impact absorber 80 can be aligned with one of the top and bottom walls of the internal brace 300, or can alternately be situated to extend between the top and bottom walls of the internal brace 300 (e.g., at equal or unequal distances therefrom). In the illustrated example (see FIG. 20), the internal brace 300 is shifted slightly into the upper portion of the side rail 332, but not so far as to shift it entirely above the plane P1. In other words, although the internal brace 300 is not centered on the plane P1, the plane P1 intersects the internal brace 300. Due to the arrangement as shown, the plane P1 is closer to the bottom wall of the internal brace 300 than the top wall of the internal brace 300.

FIG. 19 illustrates an exemplary construction for facilitating the securement of the internal brace to the outer box portion of the side rail 332. In particular, the inboard sidewall 396 includes a plurality of cutouts or windows 355 through which access is provided to the internal brace 300 for welding. The plurality of windows 355 can all be uniform in size and shape, or uneven in one or both of size and shape. As shown, each window 355 is provided in a single oriented row, each window 355 being formed as an elongated slot along the direction of the row. The internal brace 300 can be centered vertically with respect to the row of windows 355, or alternately can be shifted closer to one of the top or bottom walls. In the manufacture of the side rail 332, the windows 335 can be partially or fully filled with weld.

Figure 21:
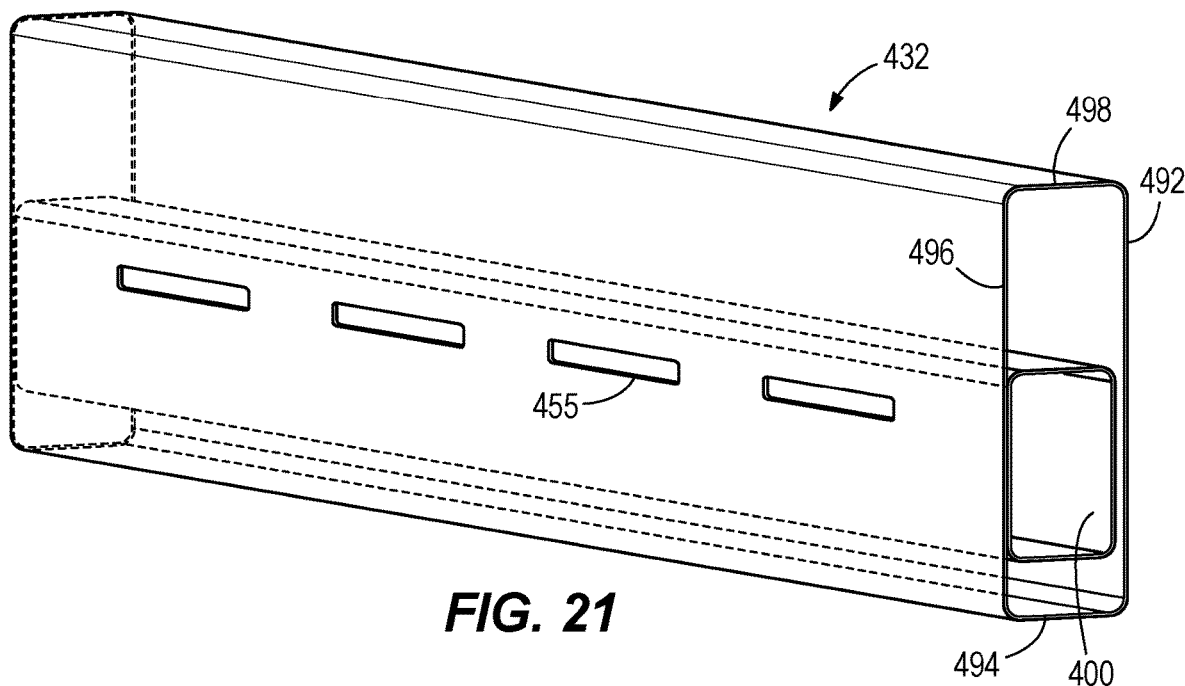
FIG. 21 is a perspective view of a portion of a vehicle frame including the multi-member side impact absorber and a rail construction according to yet another embodiment of the present disclosure.
Figure 22:
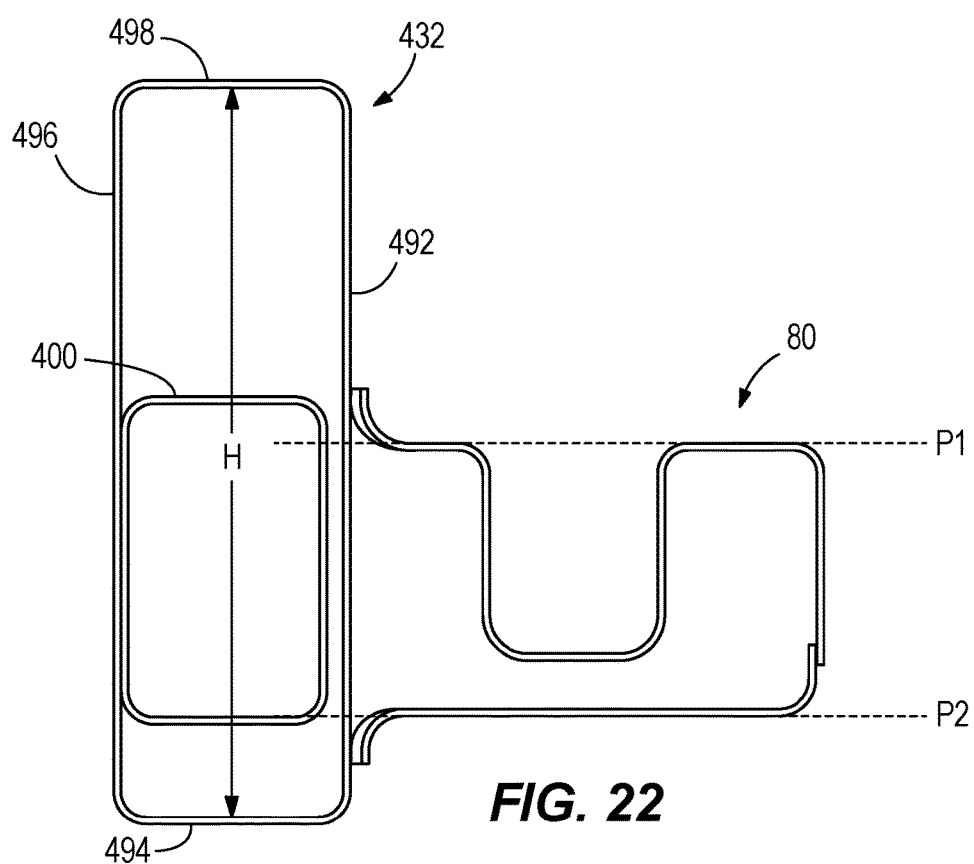
FIG. 22 is a cross-section view of the frame portion of FIG. 21.

FIGS. 21 and 22 illustrate the side impact absorbers 80 applied to a side rail 432 having yet another alternate construction, which again can be a center or mid rail section of the frame, which can be a frame for the body-on-frame construction of a hybrid or electric vehicle. In particular, the side rail 432 is similar to the side rails 232, 332, except as noted herein. As such, the side rail 432 of FIGS. 21 and 22 includes an internal brace 400 that is formed separately from and placed inside an outer box portion of the side rail 432 provided by the outboard sidewall 492, bottom wall 494, inboard sidewall 496, and a top wall 498. The internal brace 400 can be positioned along the plane P1 of the soft load path, which may be at the midpoint of the height H of the side rail 432. The illustrated internal brace 400 is again of rectangular tubular cross-section, but in this instance having a height that exceeds its width. In particular, the height of the internal brace 400 may be at least 1.25 times the width thereof. The internal brace 400 has opposing sidewalls, one or both of which contacts an inner surface of the respective sidewall 492, 496 of the outer box portion of the side rail 432. In some constructions, the internal brace 400 is secured (e.g., welded) to only one of the two sidewalls, in particular the inboard sidewall 496. Like the side rail 332, the side rail 432 can be provided with cutouts or windows 455 to facilitate welding of the internal brace 400 from outside the outer box portion. Measured parallel to the height H of the side rail 432, the height of the internal brace 400 can be at least one-third of the height H (e.g. between 40 percent and 60 percent of the height H). The plane P1 of the soft load path of the side impact absorber 80 can be aligned with one of the top and bottom walls of the internal brace 400, or can alternately be situated to extend between the top and bottom walls of the internal brace 400 (e.g., at equal or unequal distances therefrom). In the illustrated example (see FIG. 22), the internal brace 400 is shifted slightly into the lower portion of the side rail 432, but not so far as to shift it entirely below the plane P1. In other words, although the internal brace 400 is not centered on the plane P1, the plane P1 intersects the internal brace 400. Due to the arrangement as shown, the plane P1 is closer to the top wall of the internal brace 400 than the bottom wall of the internal brace 400.

Figure 23:
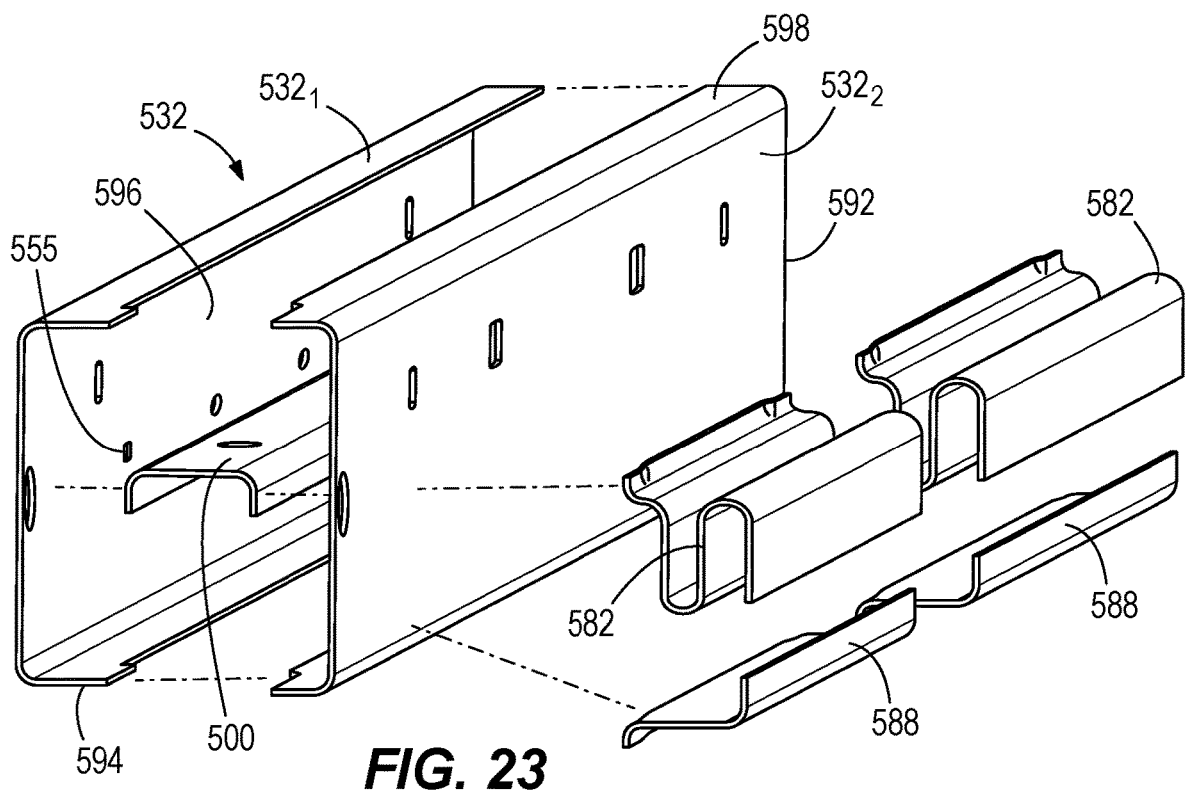
FIG. 23 is an exploded perspective view of a portion of a vehicle frame including a multi-member side impact absorber and a rail construction according to yet another embodiment of the present disclosure.
Figure 24:
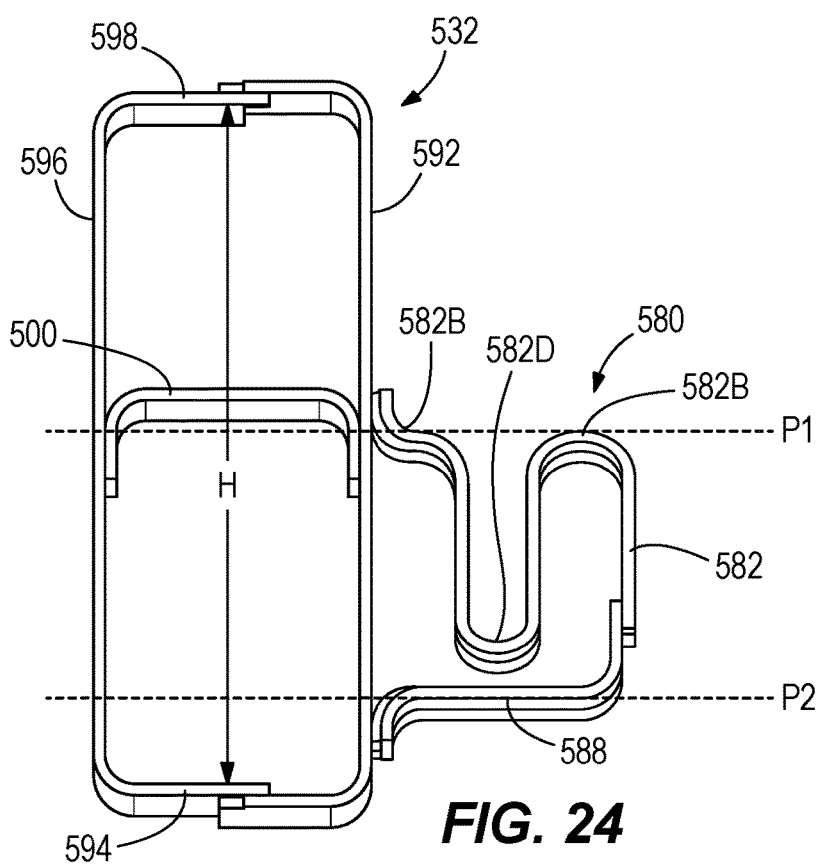
FIG. 24 is a cross-section view of the frame portion of FIG. 23.

FIGS. 23 and 24 illustrate a side rail 532 having yet another alternate construction, which again can be a center or mid rail section of the frame, which can be a frame for the body-on-frame construction of a hybrid or electric vehicle. In particular, the side rail 532 is similar to the side rails 232, 332, 432 except as noted herein. In addition, a side impact absorber 580 of an alternate construction is affixed to the outboard sidewall of the side rail 532. The side rail 532, rather than having a continuous roll-formed outer box portion, has an outer box portion that is constructed from two or more separately-formed portions. In the illustrated example, the outer box portion of the side rail 532 has a cross-section that is split into two portions 5321, 5322 (e.g., two facing C-profiles open toward each other). As such, each of the sidewalls 592, 596 is formed continuous throughout, while each of the bottom and top walls 594, 598 is formed discontinuously, being partly formed by one of the two C-shaped side rail portions 5321 and partly formed by the other one of the two C-shaped side rail portions 5322. The two C-shaped side rail portions 5321, 5322 are welded together, either with a continuous seam weld, or multiple discrete welds to form the outer box portion. The side rail 532 includes an internal brace 500, which can be in a form similar to those of the other disclosed embodiments, or in this case as a C-profile. As illustrated, the C-profile of the internal brace 500 opens in the downward direction, although other orientations are optional. The internal brace 500 can be positioned similarly to one or more of the internal braces described above. For example, the internal brace 500 can be positioned in the central portion or closer to the height-wise center than the bottom or top walls 594, 598. The first reference P1 of the side impact absorber 580 intersects at least a portion of the internal brace 500—in this case only the downward flanges thereof and not the horizontal portion spanning the sidewalls 592, 596.

Compared to the side impact absorber 80 of the preceding embodiments, the side impact absorber 580 is more compact and has a rounded profile, without flats, along the peak portions 582B that intersect the first reference P1 and along the trough portion 582D that intersects the second reference plane P2. In other words, the peak and trough portions 582B, 582D are continuously radiused or curved throughout, either having a constant or variable radius of curvature. Similar to the side impact absorber 80, the shape of the wave member 582 precludes a straight continuous load path from the outboard end of the side impact absorber 580 to the side rail 532, instead presenting multiple distinct, laterally spaced portions of the wave member 582 (the peak portions 582B) that lie along the first reference plane P1. The reinforcement member 588 adjacent the wave member 582 provides a straight continuous load path to the side rail 532 from the outboard end of the side impact absorber 580 along the second reference plane P2. This and other features of the side impact absorber 580 not mentioned specifically herein are similar in construction and performance to the side impact absorber 80 of the preceding description and drawings. The side rail 532 and side impact absorber 580 can be particularly suited to a different electric or hybrid electric vehicle than that of the preceding embodiments. For example, the vehicle may have a different overall width, weight, battery pack, and/or powertrain.

Figure 25:
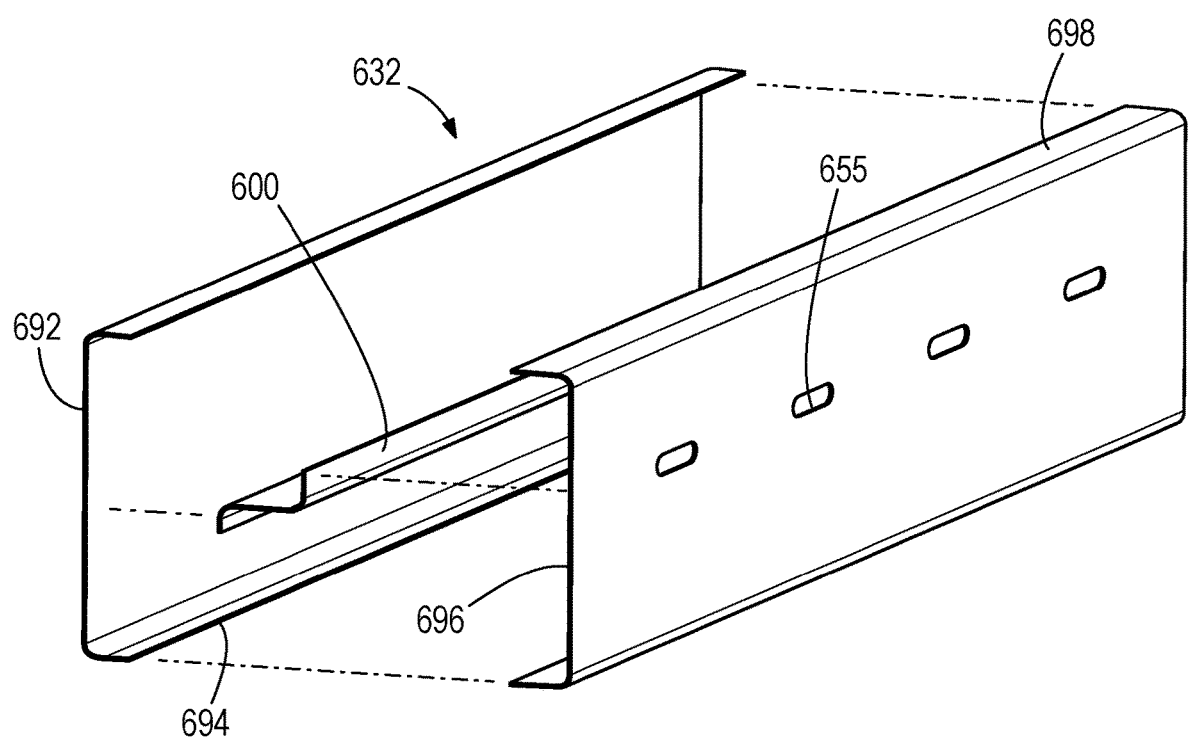
FIG. 25 is an exploded perspective view of a portion of a vehicle frame including a multi-member side impact absorber and a rail construction according to yet another embodiment of the present disclosure.

FIG. 25 illustrates a side rail 632 having an internal brace 600 with an "S" or "Z" profile positioned between the outboard and inboard sidewalls 692, 696 at a height between the bottom wall 694 and the top wall 698. As illustrated, the internal brace 600 includes a horizontal leg, a first vertical leg adjacent the sidewall 692, and a second vertical leg adjacent the sidewall 696. The first and second vertical legs extend in opposite directions (e.g., downward and upward, respectively). The side rail 632 includes a plurality of cutouts or windows 655 through which access is provided to the second leg of the internal brace 600 for welding.

Various features of the present invention are set forth in the following claims.

What is claimed is:

1. A vehicle frame for a hybrid or electric vehicle, the frame comprising:
    a pair of longitudinally-extending side rails being positioned in spaced relation across a width direction of the vehicle frame to define a battery space therebetween; and
    a side impact absorber positioned on a first one of the pair of longitudinally-extending side rails,
    wherein the first side rail includes
        a vertically-extending outboard sidewall, and
        a bottom wall extending inward from a bottom of the outboard sidewall to an inboard sidewall of the first side rail,
    wherein a first member of the side impact absorber is secured to the outboard sidewall of the first side rail to define a first energy-absorbing load path to the first side rail in the event of a side impact, the first member having a wave-form shape and extending laterally outward from the outboard sidewall to an outboard end of the side impact absorber, and
    wherein a second member of the side impact absorber is secured to the outboard sidewall of the first side rail, further from a height-wise center of the first side rail than the first member of the side impact absorber, the second member defining a second energy-absorbing load path from the outboard end of the side impact absorber to the first side rail in the event of a side impact.

2. The vehicle frame of claim 1, wherein the wave-form shape of the first member defines a plurality of peak portions having a first vertical spacing from the second member and at least one trough portion having a second vertical spacing from the second member, the first vertical spacing being greater than the second vertical spacing.

3. The vehicle frame of claim 2, wherein the first member is constructed of a sheet of a first material having a yield strength less than a yield strength of a sheet of a second material from which the second member is constructed.

4. The vehicle frame of claim 3, wherein the sheet of the first material and the sheet of the second material both have the same sheet thickness.

5. The vehicle frame of claim 3, wherein the first side rail is constructed with a wall thickness less than a sheet thickness of the sheet of the first material and less than a sheet thickness of the sheet of the second material, and the material of the first side rail has a yield strength greater than a yield strength of the first material and greater than a yield strength of the second material.

6. The vehicle frame of claim 1, further comprising a second side impact absorber positioned on the first side rail longitudinally aft of the side impact absorber, the second side impact absorber comprising:
    a first member secured to the outboard sidewall of the first side rail to define a first energy-absorbing load path to the first side rail in the event of a side impact to the second side impact absorber, the first member having a wave-form shape and extending laterally outward from the outboard sidewall to an outboard end of the second side impact absorber, and
    a second member secured to the outboard sidewall of the first side rail, further from the height-wise center of the first side rail than the first member of the second side impact absorber, the second member defining a second energy-absorbing load path from the outboard end of the second side impact absorber to the first side rail in the event of a side impact to the second side impact absorber.

7. The vehicle frame of claim 1, wherein the first energy-absorbing load path has a lower buckling resistance and lower energy absorption capacity than a buckling resistance and energy absorption capacity of the second energy absorbing load path.

8. The vehicle frame of claim 1, wherein the side impact absorber is provided on a section of the first side rail having a cross-section profile in an uninterrupted "8" shape, including a horizontally-extending internal brace.

9. The vehicle frame of claim 8, wherein both the internal brace and a connection point between the first member of the side impact absorber and the outboard sidewall of the first side rail are positioned within a central portion of the height of the outboard sidewall.

10. The vehicle frame of claim 1, wherein a cross-section profile of the first side rail includes an internal brace extending between the inboard and outboard sidewalls, the internal brace positioned at the same height as a connection point between the first member of the side impact absorber and the outboard sidewall.

11. The vehicle frame of claim 1, wherein the second member of the side impact absorber includes a straight horizontal segment extending laterally from the outboard sidewall of the first side rail to the outboard end of the side impact absorber.

12. A vehicle frame for a hybrid or electric vehicle, the frame comprising:
    a pair of longitudinally-extending side rails being positioned in spaced relation across a width direction of the vehicle frame to define a battery space therebetween; and
    a side impact absorber positioned on a first one of the pair of longitudinally-extending side rails, the side impact absorber comprising
        a first member of the side impact absorber secured to the first side rail to define a first energy-absorbing load path through the side impact absorber to the first side rail in the event of a side impact, and
        a second member of the side impact absorber secured to the first side rail, the second member defining a second energy-absorbing load path through the side impact absorber to the first side rail in the event of a side impact, the second energy-absorbing load path being stiffer than the first energy-absorbing load path of the first member and positioned further from a height-wise center of the first side rail than the first energy-absorbing load path of the first member.

13. The vehicle frame of claim 12, wherein the side impact absorber is provided on a portion of the first side rail having a cross-section profile including an internal brace between inboard and outboard sidewalls of the first side rail.

14. The vehicle frame of claim 13, wherein the cross-section profile of the first side rail portion is formed in an uninterrupted "8" shape including the internal brace.

15. The vehicle frame of claim 13, wherein the internal brace has a rectangular tubular cross-section.

16. The vehicle frame of claim 13, wherein the first energy-absorbing load path extends along a horizontal plane at the height-wise center of the first side rail, the horizontal plane intersecting the internal brace.

17. The vehicle frame of claim 13, wherein the first energy-absorbing load path extends along a horizontal plane, and the internal brace is offset from the horizontal plane.

18. The vehicle frame of claim 12, wherein the first member of the side impact absorber has a wave-form shape when viewed in cross-section taken through a plane along the width direction, and wherein the second member of the side impact absorber includes a straight horizontal segment extending laterally from the outboard sidewall of the first side rail to the outboard end of the side impact absorber.

19. The vehicle frame of claim 18, wherein the first member is constructed of a sheet of a first material having a yield strength less than a yield strength of a sheet of a second material from which the second member is constructed, and wherein the sheet of the first material and the sheet of the second material both have the same sheet thickness.

20. The vehicle frame of claim 19, wherein the first side rail is constructed with a wall thickness less than a sheet thickness of the sheet of the first material and less than a sheet thickness of the sheet of the second material, and the material of the first side rail has a yield strength greater than a yield strength of the first material and greater than a yield strength of the second material.

* * * * *